United States Patent [19]
Kobayashi et al.

[11] Patent Number: 5,164,825
[45] Date of Patent: Nov. 17, 1992

[54] IMAGE PROCESSING METHOD AND APPARATUS FOR MOSAIC OR SIMILAR PROCESSING THEREFOR

[75] Inventors: Takeshi Kobayashi; Hiroyuki Kimura; Susumu Matsumura, all of Yokohama; Masayuki Iimura, Kodaira, all of Japan

[73] Assignee: Canon Kabushiki Kaisha, Tokyo, Japan

[21] Appl. No.: 174,979

[22] Filed: Mar. 29, 1988

[30] Foreign Application Priority Data

| Mar. 30, 1987 | [JP] | Japan | 62-78214 |
| Mar. 30, 1987 | [JP] | Japan | 62-78215 |
| Mar. 30, 1987 | [JP] | Japan | 62-78216 |
| Mar. 30, 1987 | [JP] | Japan | 62-78217 |
| Mar. 30, 1987 | [JP] | Japan | 62-78219 |
| Apr. 1, 1987 | [JP] | Japan | 62-80487 |

[51] Int. Cl.$^5$ .............................. H04N 1/46
[52] U.S. Cl. ..................... 358/160; 358/22; 358/75
[58] Field of Search ............ 358/75, 75 I, 75 J, 358/76, 78, 79, 80, 448, 452, 457, 458, 459, 465, 466, 22, 160

[56] References Cited

U.S. PATENT DOCUMENTS

| 4,614,967 | 9/1986 | Sayanagi | 358/75 |
| 4,642,681 | 2/1987 | Ikeda | 358/75 |
| 4,651,287 | 3/1987 | Tsao | 358/459 |
| 4,654,721 | 3/1987 | Goertzel et al. | 358/459 |
| 4,667,250 | 5/1987 | Murai | 358/75 |
| 4,682,186 | 9/1987 | Sasaki et al. | 358/80 |
| 4,689,666 | 8/1987 | Hatanaka | 358/75 |
| 4,700,235 | 10/1987 | Gall | 358/459 |
| 4,700,399 | 10/1987 | Yoshida | 358/79 |
| 4,769,695 | 9/1988 | Terashita | 358/75 |
| 4,782,388 | 11/1988 | Lake | 358/22 X |
| 4,796,086 | 1/1989 | Ohta et al. | 358/80 |
| 4,888,643 | 12/1989 | Kusakabe | 358/22 X |
| 4,901,063 | 2/1990 | Kimura et al. | |

Primary Examiner—James J. Groody
Assistant Examiner—Mark R. Powell
Attorney, Agent, or Firm—Fitzpatrick, Cella, Harper & Scinto

[57] ABSTRACT

An image processing method and apparatus for obtaining, from an original image, a natural mosaic image or an image of neo-impressionistic effect. In this method and apparatus, image information of one pixel is converted into information of a block of plural pixels (multi-level data), and the latter information is arranged randomly in the block.

52 Claims, 30 Drawing Sheets

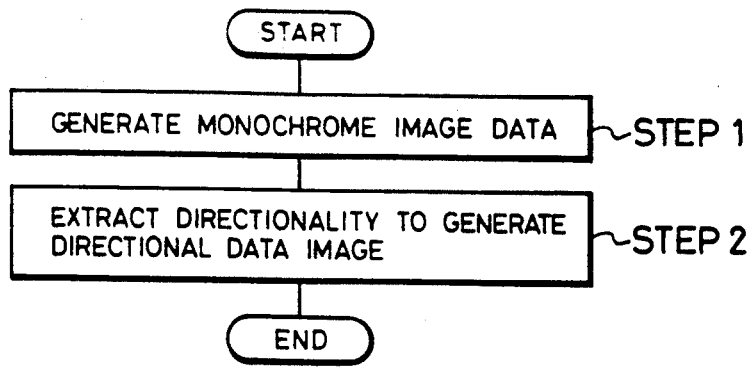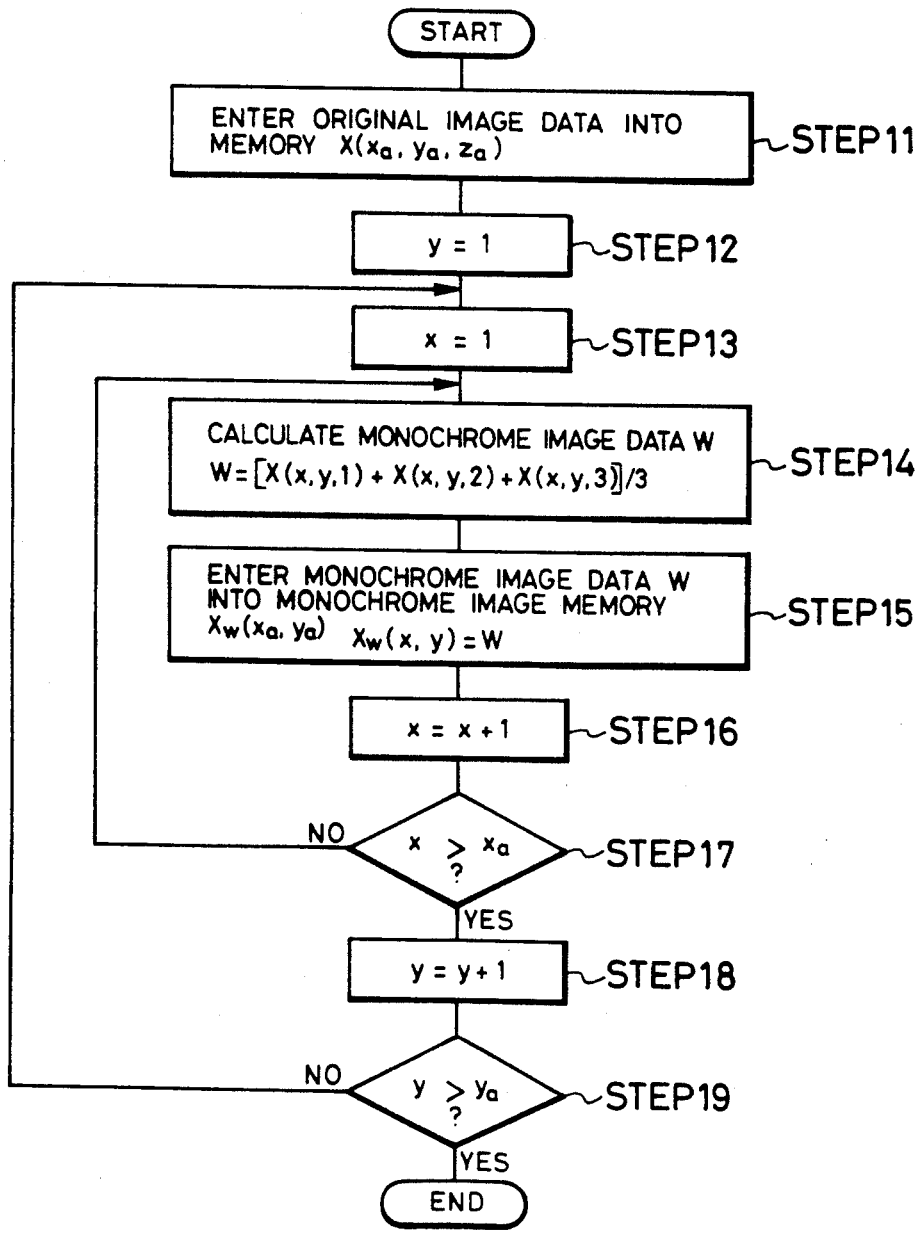

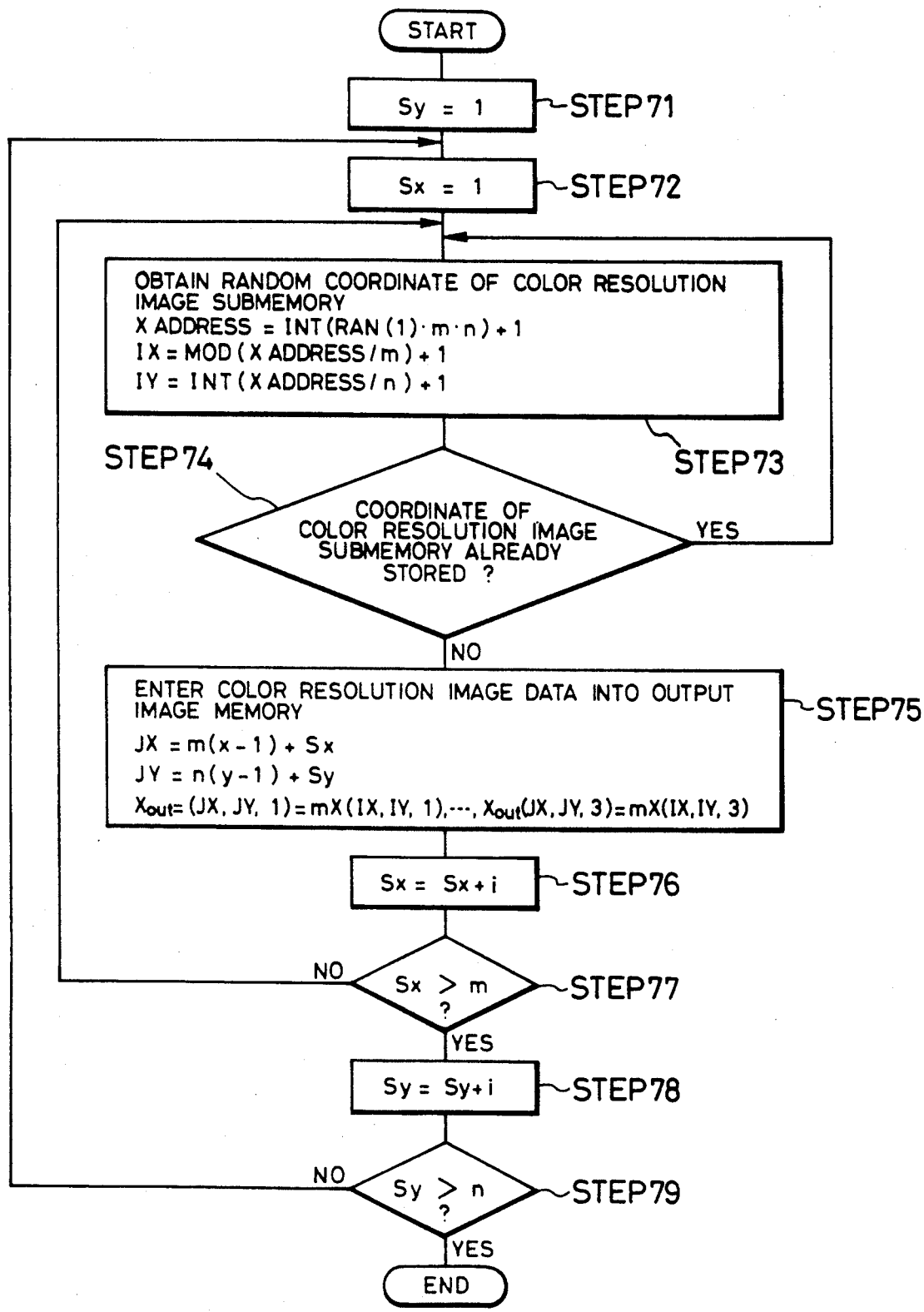

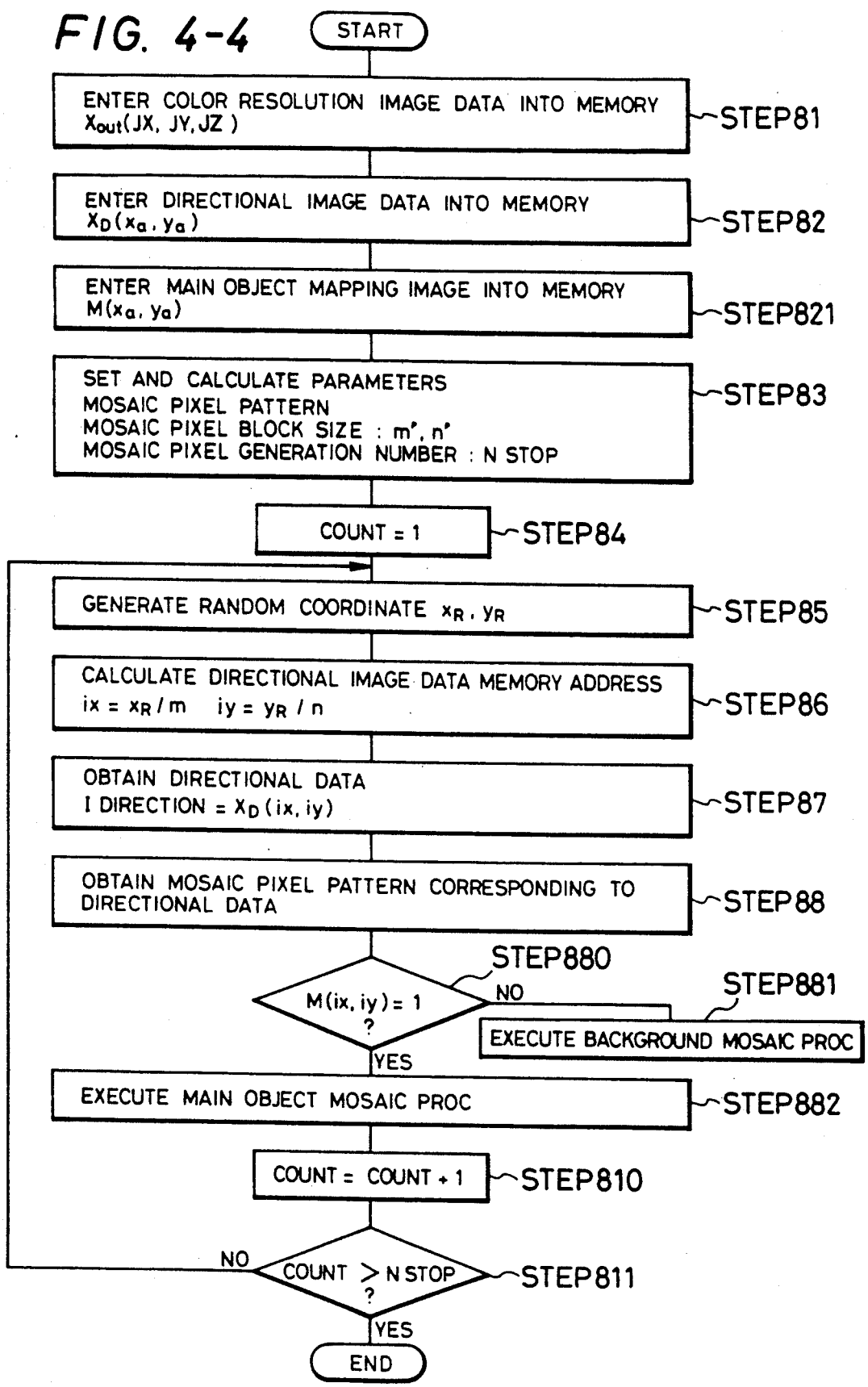

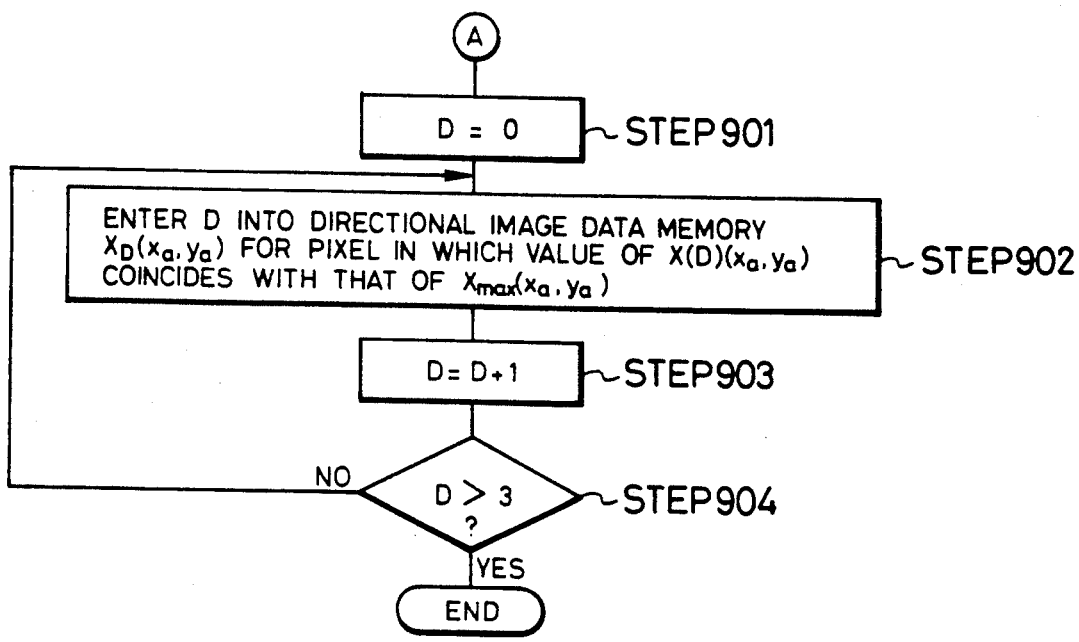

MEMORY VALUE

R(3)
R(2)
R(1)

R(1)  R(2) R(3)
MEMORY VALUE

FIG. 7-3

| 0 | 0 | 0 | 0 | 1 | 1 | 1 |
|---|---|---|---|---|---|---|
| 0 | 0 | 0 | 1 | 1 | 1 | 1 |
| 0 | 0 | 1 | 1 | 1 | 1 | 1 |
| 0 | 1 | 1 | 1 | 1 | 1 | 0 |
| 1 | 1 | 1 | 1 | 1 | 0 | 0 |
| 1 | 1 | 1 | 1 | 0 | 0 | 0 |
| 1 | 1 | 1 | 0 | 0 | 0 | 0 |

FIG. 7-4

|    |    |    |    | 1  | 2  | 3  |
|----|----|----|----|----|----|----|
|    |    |    | 4  | 5  | 6  | 7  |
|    |    | 8  | 9  | 10 | 11 | 12 |
|    | 13 | 14 | 0  | 15 | 16 |    |
| 17 | 18 | 19 | 20 | 21 |    |    |
| 22 | 23 | 24 | 25 |    |    |    |
| 26 | 27 | 28 |    |    |    |    |

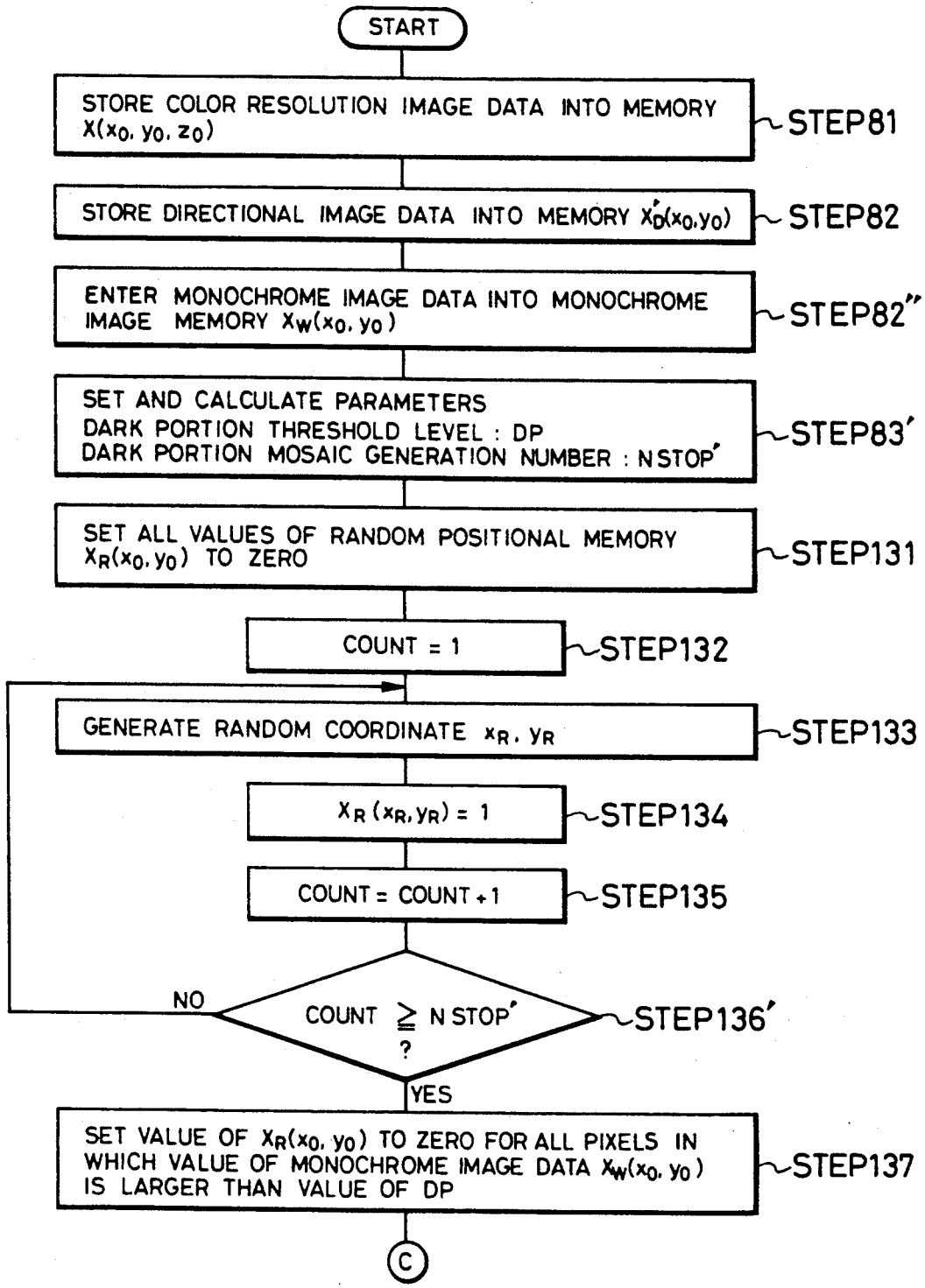

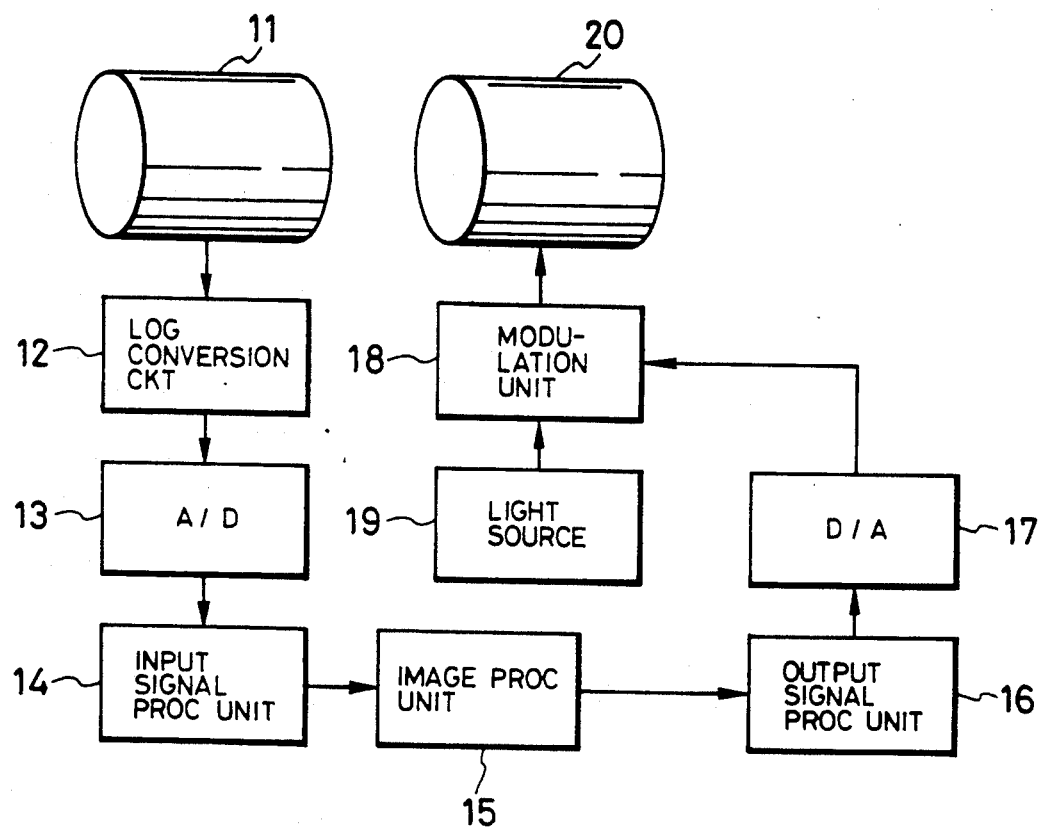

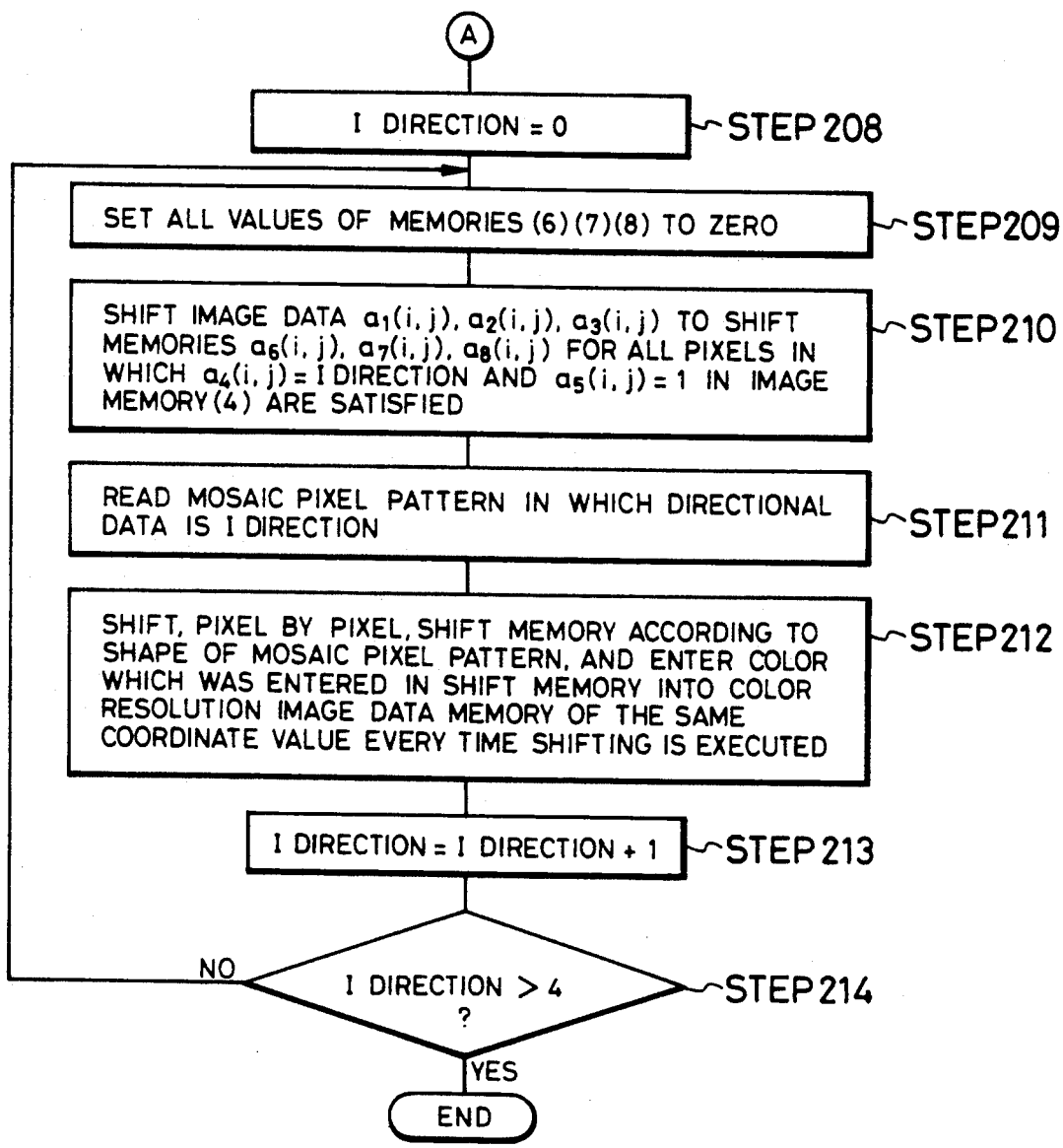

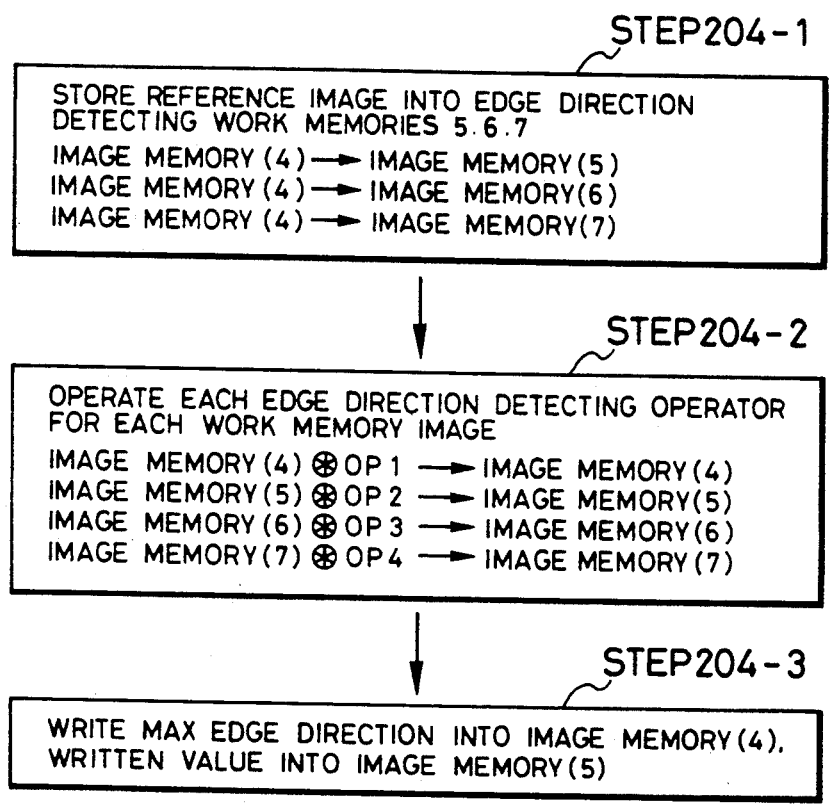

FIG. 13

```
STEP207-1
┌─────────────────────────────────────────┐
│ SET ALL VALUES OF RANDOM POSITIONAL MEMORY │
│ IMAGE MEMORY (5) TO ZERO                │
└─────────────────────────────────────────┘
               │
         ┌───────────┐
         │ COUNT = 1 │ — STEP207-2
         └───────────┘
               │
    ┌──────────────────────────────┐
    │ GENERATE RANDOM COORDINATE ($i_R, j_R$) │
    └──────────────────────────────┘
               │                              STEP207-3
         ┌──────────────┐
         │ $a_5(i_R, j_R) = 1$ │         STEP207-4
         └──────────────┘
               │
         ┌────────────────┐
         │ COUNT = COUNT + 1 │ — STEP207-5
         └────────────────┘
               │
       ◇ COUNT ≧ N STOP ? ◇ — STEP207-6
          NO │        │ YES
             │   ┌─────────┐
             │   │ STEP 208 │
             │   └─────────┘
```

FIG. 14

| 1 | 0 | 0 |
|---|---|---|
| 0 | 0 | 0 |
| 0 | 0 | -1 |

OP1

| 0 | 1 | 0 |
|---|---|---|
| 0 | 0 | 0 |
| 0 | -1 | 0 |

OP2

| 0 | 0 | 1 |
|---|---|---|
| 0 | 0 | 0 |
| -1 | 0 | 0 |

OP3

| 0 | 0 | 0 |
|---|---|---|
| -1 | 0 | 1 |
| 0 | 0 | 0 |

| 0 | 0 | 0 | 0 | 1 | 1 | 1 |
|---|---|---|---|---|---|---|
| 0 | 0 | 0 | 1 | 1 | 1 | 1 |
| 0 | 0 | 1 | 1 | 1 | 1 | 1 |
| 0 | 1 | 1 | 1 | 1 | 1 | 0 |
| 1 | 1 | 1 | 1 | 1 | 0 | 0 |
| 1 | 1 | 1 | 1 | 0 | 0 | 0 |
| 1 | 1 | 1 | 0 | 0 | 0 | 0 |

FIG. 16

| 0 | 0 | 0 | 1 | 0 | 0 | 0 |
|---|---|---|---|---|---|---|
| 0 | 0 | 1 | 1 | 1 | 0 | 0 |
| 0 | 1 | 1 | 1 | 1 | 0 | 0 |
| 1 | 1 | 1 | 1 | 1 | 1 | 1 |
| 0 | 1 | 1 | 1 | 1 | 0 | 0 |
| 0 | 0 | 1 | 1 | 1 | 0 | 0 |
| 0 | 0 | 0 | 1 | 0 | 0 | 0 |

FIG. 17

|   |   |   | 1 |   |   |   |
|---|---|---|---|---|---|---|
|   |   | 2 | 3 | 4 |   |   |
|   | 5 | 6 | 7 | 8 |   |   |
| 9 | 10 | 11 | 0 | 12 | 13 | 14 |
|   | 15 | 16 | 17 | 18 |   |   |
|   |   | 19 | 20 | 21 |   |   |
|   |   |   | 22 |   |   |   |

FIG. 18

| 0 | 0 | 0 |
|---|---|---|
| $\frac{1}{6}$ | $\frac{1}{6}$ | $\frac{1}{6}$ |
| $\frac{1}{6}$ | $\frac{1}{6}$ | $\frac{1}{6}$ |

| 0 | 0 | $\frac{1}{6}$ |
|---|---|---|
| 0 | $\frac{1}{6}$ | $\frac{1}{6}$ |
| $\frac{1}{6}$ | $\frac{1}{6}$ | $\frac{1}{6}$ |

| 0 | $\frac{1}{6}$ | $\frac{1}{6}$ |
|---|---|---|
| 0 | $\frac{1}{6}$ | $\frac{1}{6}$ |
| 0 | $\frac{1}{6}$ | $\frac{1}{6}$ |

| $\frac{1}{6}$ | $\frac{1}{6}$ | $\frac{1}{6}$ |
|---|---|---|
| 0 | $\frac{1}{6}$ | $\frac{1}{6}$ |
| 0 | 0 | $\frac{1}{6}$ |

| $\frac{1}{6}$ | $\frac{1}{6}$ | $\frac{1}{6}$ |
|---|---|---|
| $\frac{1}{6}$ | $\frac{1}{6}$ | $\frac{1}{6}$ |
| 0 | 0 | 0 |

| $\frac{1}{6}$ | $\frac{1}{6}$ | 0 |
|---|---|---|
| $\frac{1}{6}$ | $\frac{1}{6}$ | 0 |
| $\frac{1}{6}$ | 0 | 0 |

| $\frac{1}{6}$ | $\frac{1}{6}$ | 0 |
|---|---|---|
| $\frac{1}{6}$ | $\frac{1}{6}$ | 0 |
| $\frac{1}{6}$ | $\frac{1}{6}$ | 0 |

| $\frac{1}{6}$ | 0 | 0 |
|---|---|---|
| $\frac{1}{6}$ | $\frac{1}{6}$ | 0 |
| $\frac{1}{6}$ | $\frac{1}{6}$ | $\frac{1}{6}$ |

| 0 | 0 | 0 |
|---|---|---|
| $\frac{1}{3}$ | $\frac{1}{3}$ | $\frac{1}{3}$ |
| 0 | 0 | 0 |

| 0 | 0 | $\frac{1}{3}$ |
|---|---|---|
| 0 | $\frac{1}{3}$ | 0 |
| $\frac{1}{3}$ | 0 | 0 |

| 0 | $\frac{1}{3}$ | 0 |
|---|---|---|
| 0 | $\frac{1}{3}$ | 0 |
| 0 | $\frac{1}{3}$ | 0 |

| $\frac{1}{3}$ | 0 | 0 |
|---|---|---|
| 0 | $\frac{1}{3}$ | 0 |
| 0 | 0 | $\frac{1}{3}$ |

1

IMAGE PROCESSING METHOD AND APPARATUS FOR MOSAIC OR SIMILAR PROCESSING THEREFOR

BACKGROUND OF THE INVENTION

1. Field of the Invention

The present invention relates to an image processing method for conversion of image data, and to an apparatus therefor.

2. Related Background Art

Among such image processing methods, there are already known electronic platemaking in the printing industry, and a professional laboratory technology utilizing computerized photographic image processing in photographic laboratories.

In such image processing, for example in the case of obtaining a reproduced image by photoelectrically scanning an original image with a high-precision scanner such as a layout scanner or a laser color printer, an image processing unit is inserted in the image reproduction process to effect various processes on the input density signal, such as gamma correction, modification of tonal rendition, color correction, image cutout and image synthesis, thereby achieving the following functions:

(1) restoration of faded colors of a color film;
(2) correction of rendition in highlight and shadow areas and emphasis in colors;
(3) salvage of defective image resulting from a failure in the equipment, error in photographing or in film processing; and
(4) formation of a creative image for expanding the area of images or for creation of a new design.

Such special processing is executed on a digital image signal such as a density signal or luminance signal obtained by photoelectrically scanning an original film image with a high-precision color scanner, a color imaging tube or a solid-state color image sensor such as a CCD.

Among such special effects there are already known a mosaic processing for obtaining regularly arranged image, blocks, and posterization and solarization for varying the gamma curve in an unrealistic manner. However, these effects are not enough for expressing a creative image such as is desired for expanding the area of images and creating novel designs. There are also known other functions such as image cutout, image synthesis and painting as achievable with such as equipment DPB7000 (Quontel), Artron 2000 (Artronics) or Response 300 (Scitex). However, these functions, which are achieved by the operator by adding images to the original image by means of a coordinate designating device such as a tablet digitizer, require considerable time, and the skill or sense of the operator is inevitably reflected in the resulting image.

In the following there will be explained the mosaic process.

Let us consider a case of forming a mosaic block of 5 pixels in the x-direction and 5 pixels in the y-direction. Pixel information at a pixel position (m, n) is represented by a(m, n), which is a digital value obtained by an A/D conversion of the density signal or luminance signal of the original film image. In a mosaic process, there is obtained the following relationship between the pixel information a(m, n) of the original image and the pixel information a'(m, n) after processing:

$$a'(5m-i, 5n-j) = a(5m-3, 5n-3)$$

wherein $i = 0, 1, 2, 3, 4$; $j = 0, 1, 2, 3, 4$; and m and n are positive integers.

In the above-mentioned relationship the central value in a block of $5 \times 5$ pixels is taken as the representative value and is used in other pixels of the block, but said representative value may be obtained from any pixel in the block or may be the average value of the block.

However, such conventional mosaic process for obtaining regularly arranged blocks is associated with the following drawbacks, and an improvement has been desired in order to obtain a creative image:

(1) the arrangement of rectangular blocks is excessively regular; and
(2) as the pixels in a block have the same value, the obtained image lacks necessary information in the areas where the original image requires a fine expression (areas with much information having high-frequency components).

In order to resolve these drawbacks, the assignee of the present invention has proposed, in U.S. patent application Ser. No. 007,785, a method of varying the shape of a mosaic pattern according to certain parameters such as the spatial frequency or contrast of the image.

SUMMARY OF THE INVENTION

An object of the present invention is to provide a novel image processing method, and an apparatus therefor, capable of eliminating the drawbacks in the above-explained conventional technology and adding new image processings to the limited special effects conventionally available, thereby contributing to the expression of creative images, expansion of the range of images and creation of new designs.

Another object of the present invention is to provide an image processing method, and an apparatus therefor, capable of achieving a highly skilled painting technique by image processing in simple manner and enabling an unskilled person to obtain an image of neo-impressionistic effect.

Still another object of the present invention is to provide an image processing method, and an apparatus therefor, capable of giving a directional nature to the mosaic blocks, thereby enabling one to express the directional nature of the image pattern and to obtain a color presentation in more painting-like manner.

Still another object of the present invention is to provide an image processing method, and an apparatus therefor, capable, in a dark image area with a low luminosity, of also providing a complementary color, thereby enabling the processing of a painting in realistic manner and also enabling an unskilled person to easily obtain an image in the style of neo-impressionism.

Still another object of the present invention is to provide an image processing method, and an apparatus therefor, capable of rendering the image blocks less conspicuous, by converting the information of a pixel of the original image into that of plural pixels and randomly arranging thus converted plural-pixel information.

Still another object of the present invention is to provide an image processing apparatus capable of painting-like color reproduction, by converting the information of a pixel of the original image into color information of plural colors, and, if thus converted color information have a predetermined proportion, increasing the proportion of predetermined color information in comparison with the proportion of other color information.

Still another object of the present invention is to provide an image processing apparatus capable of emphasizing a subject of the image, by dividing the original image into a background area and a subject area, and employing different mosaic processes for these areas.

Still another object of the present invention is to provide an image processing apparatus capable of minimizing the averaging error in converting the information of a pixel of the original image into the information of plural pixels.

The foregoing and still other objects of the present invention will become fully apparent from the following description of the preferred embodiments to be taken in conjunction with the attached drawings.

BRIEF DESCRIPTION OF THE DRAWINGS

FIGS. 2-1 and 2-2 are views showing the principle of extracting the directional property;

FIG. 2-3 is a schematic flow chart showing a sequence of extracting the directional property;

FIG. 2-4 is a flow chart showing a sequence for preparing a black-and-white image;

FIG. 2-5 is a flow chart showing a sequence for preparing directional data;

FIG. 3-1 is a flow chart showing a sequence for painting-like color reproduction;

FIG. 3-2 is a flow chart showing a sequence for color separation;

FIG. 3-3 is a flow chart showing a sequence for random coordinate conversion;

FIGS. 4-1 and 4-4 are flow charts showing a random mosaic process with directional property;

FIG. 4-2 is a view of pixel blocks showing different directional properties;

FIG. 4-3 is a view showing the principle of mosaic process shown in FIG. 4-1;

FIG. 4-5 is a view showing the principle of mosaic process shown in FIG. 4-4;

FIG. 4-6 is a flow chart showing a sequence for mosaic process employing complementary color in the dark image area;

FIG. 4-7 is a flow chart showing a sequence of complementary color conversion;

FIGS. 5-1 and 5-2 are flow charts for when the extraction of directional property is conducted by an image processing apparatus with parallel processing capability;

FIG. 5-3 is a chart showing an example of window difference calculation in a 7×7 matrix;

FIG. 6-1 is a flow chart when the process of painting-like color reproduction is conducted by an image processing apparatus with parallel processing capability;

FIGS. 6-2 and 6-3 are charts showing the content of a look-up table for limiting the number of colors;

FIGS. 7-1 and 7-2 are flow charts when the random mosaic process with directional property is conducted by an image processing apparatus with parallel processing capability;

FIG. 7-3 is a chart showing an example of mosaic image pattern of 7×7 pixels;

FIG. 7-4 is a chart showing an example of mosaic image output;

FIGS. 7-5 and 7-6 are flow charts for when the mosaic process employing complementary color in the dark image area is conducted by an image processing apparatus with parallel processing capability;

FIG. 8 is a block diagram showing an example of the flow of density signal when the present invention is applied to a color scanner;

FIGS. 11A and 11B are flow charts of an embodiment;

FIG. 12 is a flow chart showing the details of a part of the flow chart shown in FIG. 11;

FIG. 13 is a flow chart showing the details of a part of the flow chart shown in FIG. 11;

FIG. 14 is a chart showing examples of operators for detecting the edge direction;

FIGS. 15 and 16 are charts showing examples of a mosaic pattern;

FIG. 17 is a chart showing mosaic processing by pixel shifting; and

FIG. 18 is a chart showing other operators for detecting the edge direction.

DETAILED DESCRIPTION OF THE PREFERRED EMBODIMENTS

In summary, the image processing proposed in the present embodiment is to convert an original image into a painting-like image in the style of pointilism in neo-impressionism, represented by Seurat of France. The pointilism paintings of neo-impressionism are characterized by placing primary colors in the form of dots on the canvas, instead of mixing these colors on the pallet. If a mixed color is required, the constituting primary colors are placed side by side on the canvas, and, if a dark color is required, complementary colors are placed side by side, so that such mixed color or dark color is reproduced on the retina of human eyes when the canvas is seen at a distance.

The present embodiment is to achieve such advanced painting skill by image processing in a simple manner, and allows an unskilled person to obtain an image in the style of neo-impressionism.

Now an embodiment of the present invention will be explained in detail, while making reference to the attached drawings.

Figure 1:
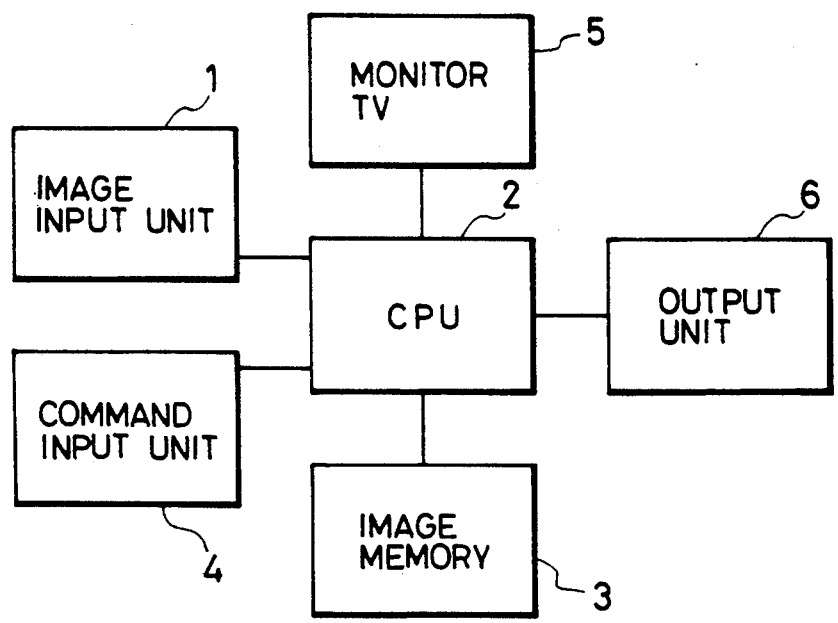
FIG. 1 is a block diagram of an embodiment of the present invention.

FIG. 1 is a block diagram of an apparatus employed in executing the image processing method embodying the present invention.

An image input unit 1 such as a television camera or a drum scanner executes sampling and A/D conversion of an original image such as a photographic film or print mounted on said input unit, thereby obtaining a digital image signal, which is supplied through a central processing unit (CPU) 2 to an image memory 3. Said image memory 3 is provided for storing the original image, processed image and work image required in the course of image processing. A command input unit 4 such as a keyboard or a digitizer is provided for entering image processing commands. In the case of the keyboard, a desired command is entered by actuation of keys. In the case of the digitizer, the operator presses a desired command selected from a menu printed on the digitizer with a stylus pen, or, if the menu is displayed on a television monitor 5, moves a cursor displayed on said television monitor 5 to the position of a desired command by moving the stylus pen and then presses the digitizer with said stylus pen. The television monitor 5 can display the image in said image memory 3 (original image, processed image or work image), or the image processing menu entered from the command input unit 4. The central processing unit 2 controls various units, and prepares a processed image by reading color information from the original image data according to the entered processing commands. The processed image thus prepared is reproduced by an output unit 6 such as a printer or a film recorder.

In the course of painting, the coloring materials of three primary colors, if mixed together, will give a turbid dark gray color. For this reason, the painters of impressionism used only several coloring materials on the pallet and attached each coloring material directly (i.e. without mixing), or after mixing with white, onto the canvas.

Thus, small dots of primary colors, placed side by side on the canvas, are sensed as a mixed color on the retina when viewed from a distance. Also, a dark area is not painted with a coloring material of dark color, but is represented by a primary color or a nearly saturated color mentioned above and a complementary color placed beside it.

In this manner, each touch of the painting brush on the canvas has a color relatively close to a primary color, which is not reproduced in the painting-like processing in the conventional computerized image process. Also, said touch is often not uniform but has a directional character along one of the edges of the image.

The present embodiment provides a processing method free from the foregoing drawbacks, consisting of the following four steps executed in the successive order:

(1) a directionality extraction step to extract the directional character of the original image for preparing directional image data;

(2) a painting-like color reproduction step for making color reproduction in the style of painting;

(3) a directional random mosaic processing step for giving directional character to the touches of the painting brush, utilizing the directional image data obtained in (1); and (4) a complementary-color mosaic processing step a dark area, for reproducing a dark area with a complementary color.

These steps will be explained in the following.
(1) Directionality extraction process In general the touches of the painting brush in a painting are not uniformly distributed but have a directional character along one of the edge lines of the image. For reproducing such touches it is necessary to extract the directionality of the pattern of the original image. In the present embodiment, therefore, a differential step is conducted on the original image to extract the directionality and to prepare directional image data, and in the mosaic processing said directional image data are utilized to generate directional mosaic data, thereby generating a mosaic image containing touches of the painting brush.

Figures 1, 2:
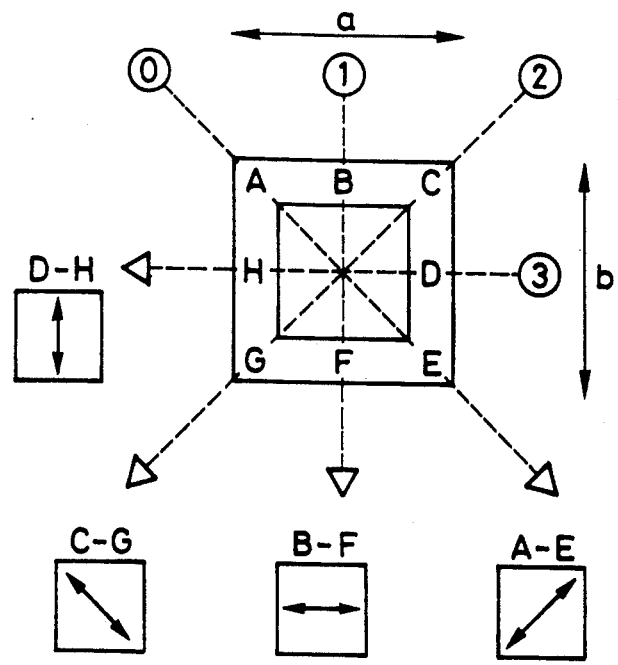
Figure 2:
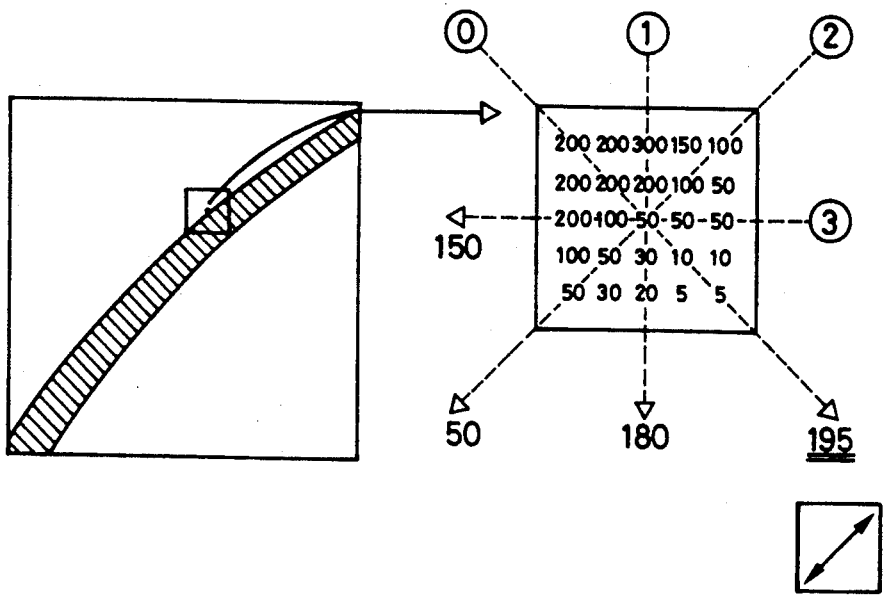
Figures 2, 3, 4, 5:
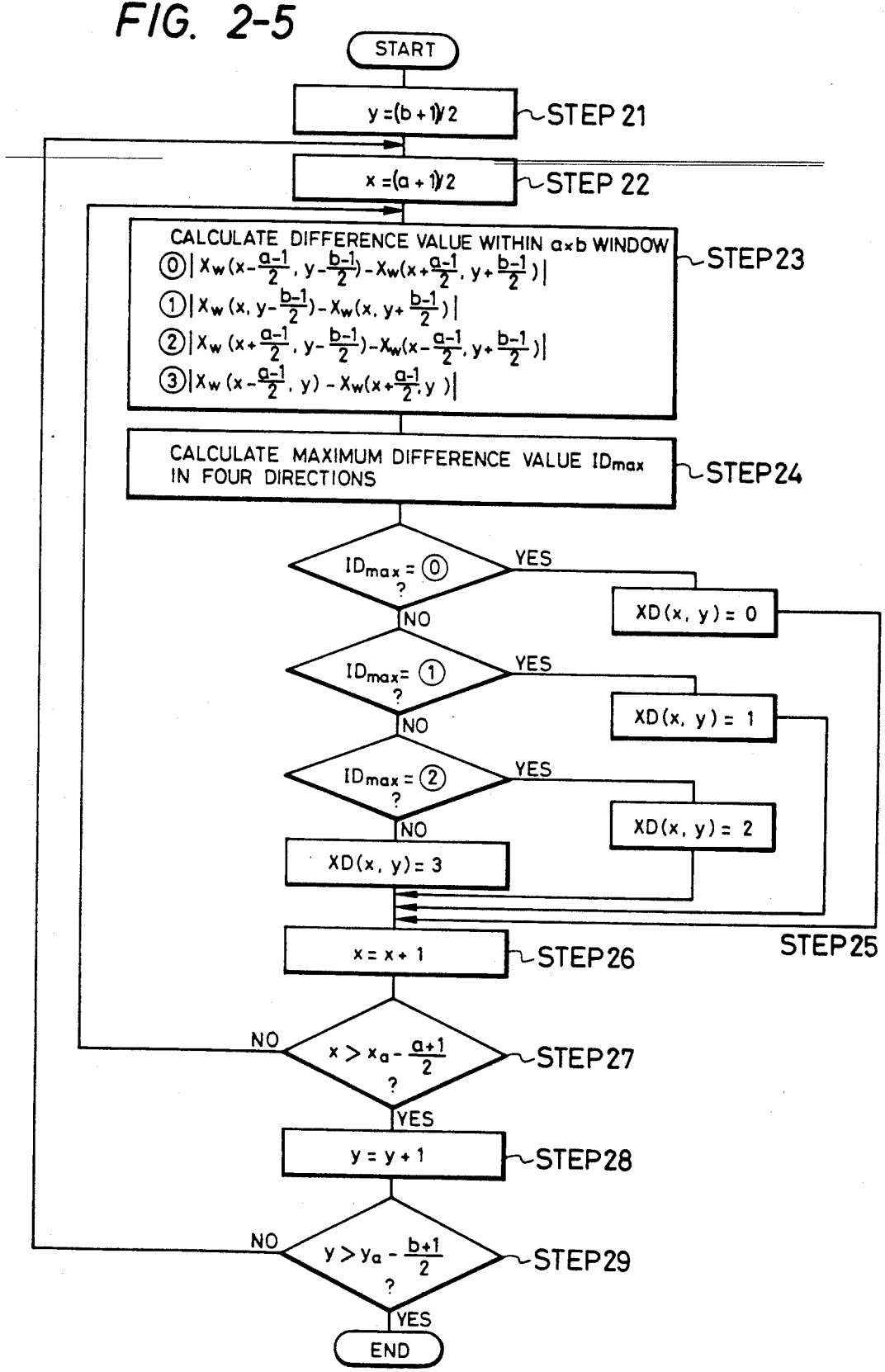
Figures 1, 3:
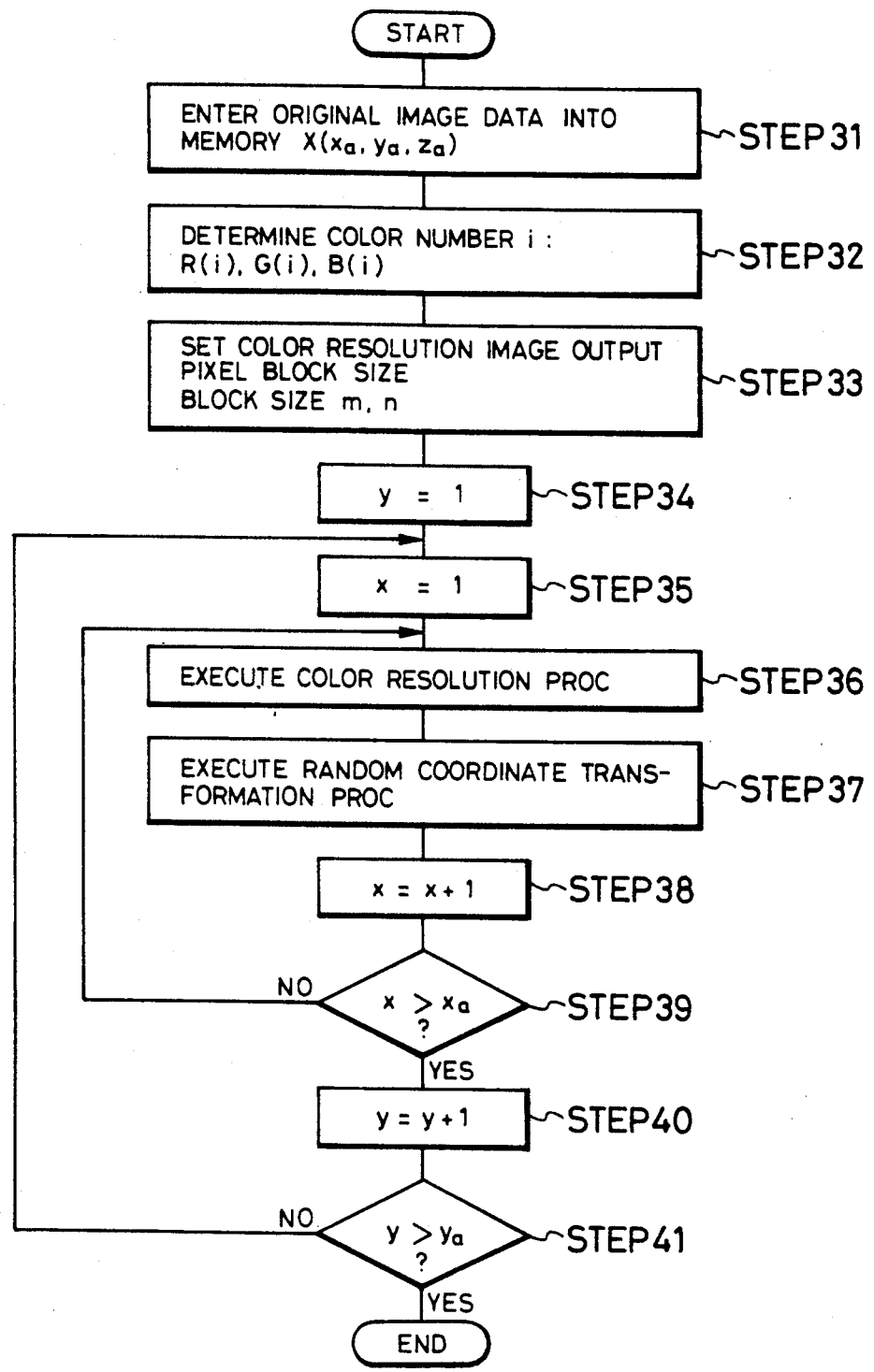
Figures 2, 3:
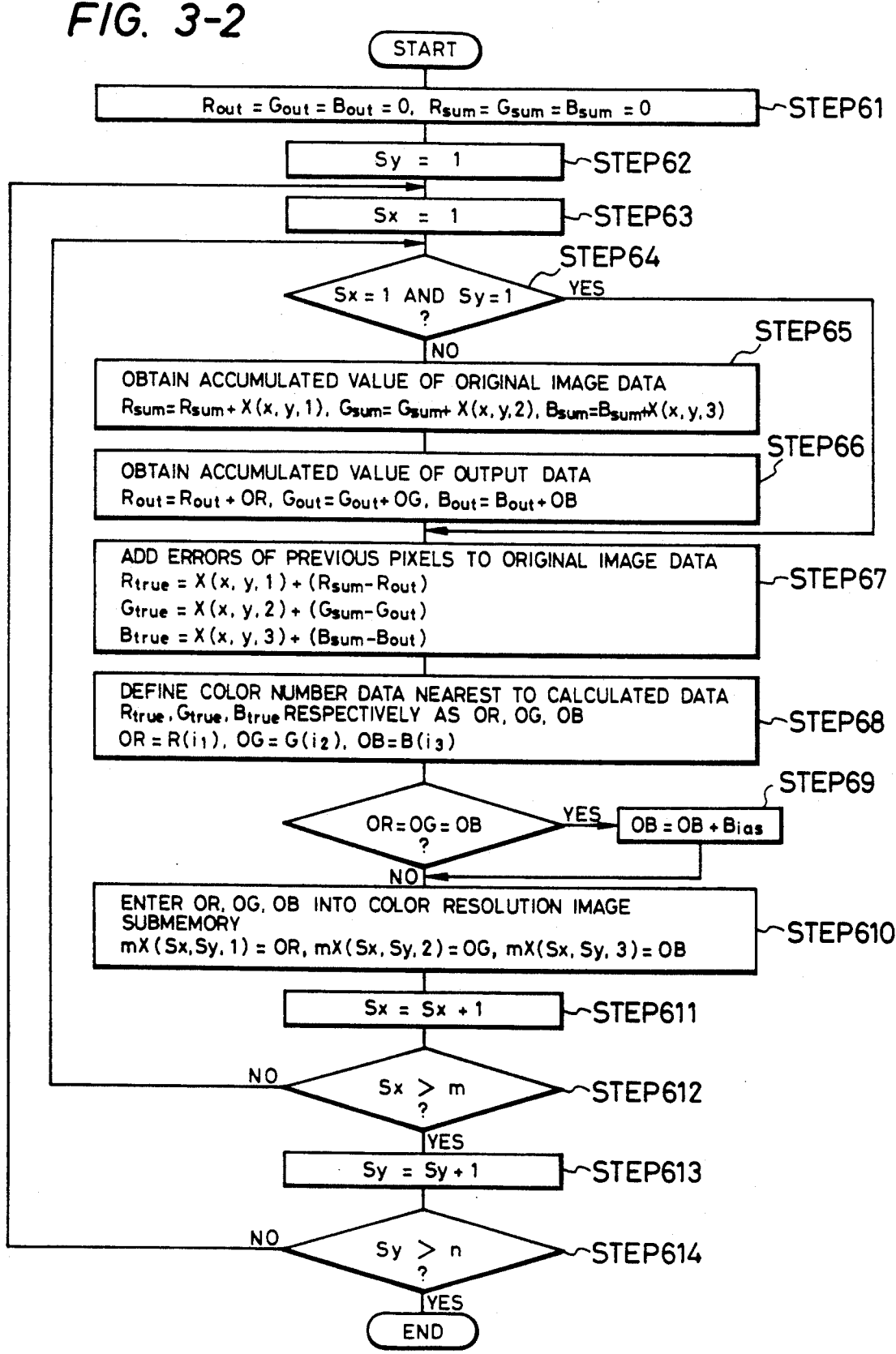

Now reference is made to FIG. 2-3 for explaining said directionality extraction process.

Step 1: The input original image is converted into a black-and-white image, since a color image is not required for extraction of directionality.

Step 2: A differential process of a window size of m×n pixels is applied to the black-and-white image prepared in the step 1, to prepare directional image data.

In the following the preparation of black-and-white image in the step 1 and that of directional image data in the step 2 will be explained in detail.

Reference is made to FIG. 2-4 for explaining the preparation of black-and-white image.

Step 11: Original image data are stored in a memory X(Xa, Ya, Za), wherein Za=1=R, Za=2=G and Za=3=B respectively represent red, green and blue components of the image.

Step 12: A line counter Y for a memory Xw(Xa, Ya) for the obtained black-and-white image data is initialized to "1".

Step 13: A column counter X for said memory is initialized to "1".

Step 14: The red, green and blue components of the original image data are read from the memory X(Xa, Ya, Za) and are averaged according to the following equation to obtain monochrome (black-and-white) data:

$$W=\{X(x,y,1)+X(x,y,2)+X(x,y,3)\}/3$$

Step 15: The monocolor image data W calculated in the step 14 are stored in a monocolor image memory Xw(xa, ya).

Steps 16, 17: The count of the column counter x is shifted up, and steps 14, 15 and 16 are repeated until the column size Xa of the original image is exceeded.

Steps 18, 19: The count of the line counter y is shifted up, and steps 13, 14, 15, 16, 17 and 18 are repeated until the line size ya of the original image is exceeded. The monochrome image data are prepared in this manner.

Preparation of directional image data

In the following the concept of said preparation will be explained, while making reference to FIGS. 2-1 and 2-2.

The monochrome image Xw(xa, ya) prepared above are scanner over a window of size a×b, and a differential processing is conducted in said window (5×5) to detect directionality. FIG. 2-1 shows the differential processing in said window and the detected directionality. Said differential process is capable of detecting four directions: a 45° direction from front left to back right (difference largest in a direction "0"), a lateral direction (difference largest in a direction "1"), a 45° direction from front right to back left (difference largest in a direction "2"), and a vertical direction (difference largest in a direction "3"). FIG. 2-2 shows, as an example, the detection of directionality of an image pattern shown at left.

Differential processing conducted in a window of 5×5 pixels, shown in FIG. 2-2, provides largest difference in direction "0", so that the directionality is identified to be in a 45° direction from front left to back right, and a directionality signal "0" is released.

Now reference is made to FIG. 2-5 for explaining the control sequence of the preparation of directional image data:

Step 21: The line counter y of the memory Xw (xa, ya) for the monochrome image data obtained in the above-explained preparation is initialized to (b+1)/2.

Step 22: The column counter x of said memory is initialized to (a+1)/2.

The above-mentioned values a, b are odd numbers, and $$\left(\frac{a+1}{2}, \frac{b+1}{2}\right)$$

indicates the central address of the window of a×b pixels.

Step 23: Differences in four directions in the window of a×b pixels are calculated by the following equations:

$$Xw\left(x - \frac{a-1}{2}, y - \frac{b-1}{2}\right) - \tag{0}$$

$$Xw\left(x + \frac{a-1}{2}, y + \frac{b-1}{2}\right)$$

$$Xw\left(x, y - \frac{b-1}{2}\right) - Xw\left(x, y + \frac{b-1}{2}\right) \tag{1}$$

$$Xw\left(x + \frac{a-1}{2}, y - \frac{b-1}{2}\right) - \tag{2}$$

$$Xw\left(x - \frac{a-1}{2}, y + \frac{b-1}{2}\right)$$

$$Xw\left(x - \frac{a-1}{2}, y\right) - Xw\left(x + \frac{a-1}{2}, y\right) \tag{3}$$

Step 24: There is determined the maximum $ID_{max}$ of the absolute values of the differences (0) to (3) obtained in the step 23.

Step 25: A directionality data memory XD(x, y) is given a directionality data, which is "0" if the maximum of the absolute value of the difference is in the direction "0", and "1", "2" or "3" respectively if said maximum is in the direction "1", "2" or "3".

Steps 26, 27: The count of the column counter x is increased stepwise, and steps 23, 24, 25 and 26 are repeated until said count exceeds $$xa - \frac{a+1}{2},$$

thereby enabling a scanning operation in the window of a×b pixels.

Steps 28, 29: The count of the column counter y is increased stepwise, and the steps 22, 23, 24, 25, 26, 27 and 28 are repeated until said count exceeds $$ya - \frac{b+1}{2}.$$

The directionality at each pixel position of the original image is determined in this manner.

(2) Processing for painting-like color reproduction

As explained before, each touch of the painting brush on the canvas is relatively close to a primary color. In order to achieve painting-like color reproduction, the present embodiment limits the R, G and B data to be employed, and reproduces the original image data as correctly as possible with thus limited R, G and B data.

Now reference is made to FIGS. 3-1, 3-2 and 3-3 for explaining the painting-like color reproduction. FIG. 3-1 is a flow chart showing the control sequence of said reproduction.

Step 31: Original image data are supplied to a memory X(Xa, Ya, Za), in which $Z_1=R$, $Z_2=G$ and $Z_3=B$ respectively represent red, green and blue components of the image.

Step 32: The number of usable colors is determined.

The operator enters the number i of colors by means of the command input unit 4, for example a keyboard. For example, if i=3, there can be used 3 colors for each of R, G and B, so that there can be used 27 combinations of R, G and B in total. However the value of i is preferably selected to be equal to 3 or 4, since an excessively large value of i gives rise to a reproduction close to the original color. According to the selected value of i, the values R(1), ..., R(i), G(1), ..., G(i), B(1), ..., B(i) are read from a previously prepared file to determine 3×i colors. The color values in said file are selected as primary colors and nearly saturated colors, in order to simulate the use of colors in neo-impressionism.

Step 33: The operator enters the pixel block size m, n by the command input device. For example, in response to the entry of m=3 and n=3, a pixel of the original image is released as a block of 3×3 pixels by a color separation process in step 36.

Step 34: The line counter y of the memory X(Xa, Ya, Za) is set to "1".

Step 35: The column counter x of said memory X is set to "1".

Step 36: There is conducted processing for reproducing the original image data with the number of colors limited in step 12, as will be explained later in detail.

Step 37: The pixel block data determined in step 36 will make the blocks excessively conspicuous if said data are released. Therefore, in order to make said blocks less conspicuous, the arrangement of said data in each block is randomized, as will be explained later.

Step 38: The count of the column counter x is increased by one.

Step 39: Steps 36, 37 and 38 are repeated until said count exceeds Xa.

Step 40: The count of the line counter y is increased by one.

Step 41: Steps 35, 36, 37, 38, 39 and 40 repeated until the count of the line counter y exceeds Ya.

In the following there will be explained the principle of the color separation process.

The color separation process is for the purpose of reproducing the original image data as correctly as possible with the limited number of colors, by using, for a pixel of the original image, plural pixels of said limited colors. As an example, there will be explained a case of separating the color a pixel of the original image into 2×2 pixles.

It is assumed that the R, G and B data of the original image are X=(x, y, 1)=70, X=(x, y, 2)=140 and X=(x, y, 3)=180 (hereinafter written as (70, 140, 180)), and the number of colors is selected as i=3(50, 100, 200). The number i indicates that each color is available in three levels differing, e.g., in ink density of size of dot.

Table 1 shows the case in which the data of a pixel X=(70, 140, 180) are converted into 2×2 pixels with the number of colors i=3.

TABLE 1

| | Color Separation | | |
|---|---|---|---|
| | Original data in consideration of error | Output data | Amount of error |
| 1 | 70, 140, 180 | 50, 100, 200 | +20, +40, −20 |
| 2 | 90, 180, 160 | 100, 200, 200 | −10, −20, −40 |
| 3 | 60, 120, 140 | 50, 100, 100 | +10, +20, +40 |
| 4 | 80, 160, 220 | 50, 200, 200 | +30, −40, +20 |

The calculation in Table 1 is conducted as follows. In the first pixel, the output data are selected as (50, 100, 200) since they are closest to the original image data (70, 140, 180), with errors of the output data −20 for R, −40 for G and +20 for B. These errors are considered in the determination of the succeeding output. Because R is difficient by 20 in the first pixel, this difference is added to the R signal 70 to obtain 90 and the output data is selected closest to this value. The same process is applied to G and B, and this calculation is repeated for 2×2 pixels.

The output data thus obtained, called color separated image data, have a size of 2×2 time the original data since each pixel of the original image is converted into 2×2 pixels. If a pixel of the original image is processed as a pixel, the output error of the output image data in comparison with the original image data is $$\left(\frac{20}{70}, \frac{40}{140}, \frac{20}{180}\right)$$

as shown in Table 2. On the other hand, when a pixel of the original image is converted into 2×2 pixels, and if the original image data are considered in the same size, the output error is $$\left(\frac{30}{280}, \frac{40}{560}, \frac{20}{720}\right)$$

which is much smaller than the above-mentioned error. Consequently, if the output image in the color separation process is selected to be larger than the original image, the original image can be reproduced with relatively small errors even with a limited number of colors.

TABLE 2

| Block size of color separated output image | Error of Output Data with Respect to Original Image Data | | |
|---|---|---|---|
| | Original data | Output data | Error |
| 1 × 1 | (70, 140, 180) | (50, 100, 200) | $\left(\frac{20}{70}, \frac{40}{140}, \frac{20}{180}\right)$ |
| 2 × 2 | (280, 560, 720) | (250, 600, 700) | $\left(\frac{30}{280}, \frac{40}{560}, \frac{20}{720}\right)$ |

Now reference is made to a flow chart shown in FIG. 3-2 for explaining the above-explained color separation process of step 36:

Step 61: Original image data accumulating counters $R_{sum}$, $G_{sum}$, $B_{sum}$ and output data accumulating counters $R_{out}$, $G_{out}$, $B_{out}$ are cleared.

Step 62: An output pixel block line counter Sy is set to "1".

Step 63: An output pixel block column counter Sx is set to "1".

Step 64: In the first loop, the sequence jumps to step 67.

Steps 65, 66: Accumulated values of the original image data and the output data are obtained.

Step 67: The errors between the original image data and the output data accumulated up to the preceding pixel, and are added to the original image data to obtain target values for determining the output data.

Step 68: Color data closest to said target values are selected as the output data, in the order of R, G and B.

Step 69: Gray or black is obtained if the data of R, G and B determined in the step 68 are the same. However, in usual paintings, such a gray or black area is scarcely present. Particularly in pointilism, such a gray or black area is expressed usually by a dark blue color. Thus, if the output data of the step 68 are identified to represent gray or black, the blue component is somewhat emphasized to attain a painting like effect (cf. the original image in FIG. 19-1 and the processed image in FIG. 19-2).

Step 610: The color-separated image data thus obtained are stored in a color-separated image sub-memory mX(sc, sy, z).

Steps 611, 612: The count of the output pixel block column counter is increased by one, and steps 64, 65, 66, 67, 68, 69, 610 and 611 are repeated until said count exceeds the value m.

Steps 613, 614: The count of the output pixel block line counter is increased by one, and steps 4, 65, 66, 67, 68, 69, 610, 611, 612 and 613 are repeated until said count exceeds the value n.

In the following the random coordinate conversion in step 37 in FIG. 1 will be explained with reference to FIG. 3-3.

As the output of the painting-like color reproduction process is in blocks of m x n pixels each, said blocks are conspicuous on the reproduced image. However, it is possible to make said blocks less conspicuous by randomizing the arrangement of data in each block. This process will be explained in the following:

Steps 71, 72: The output pixel block line counter Sy and column counter Sx are set to "1".

Step 73: The random coordinate (IX, IY) of the color-separated image sub-memory is determined by generating a random number. This operation is controlled according to the following equations in order that the coordinate values IX, IY are positioned within the output pixel block of m x n pixels:

Xaddress = INT(RAN)(1).m.n) + 1

$$IX = MOD(Xaddress/m) + 1$$

$$IY = INT(Xaddress/n) + 1$$

Step 74: In the determination of the random coordinate of the color-separated image sub-memory, the same random coordinate may be obtained twice. In such case the random number generation is continued until a different random coordinate is obtained.

Step 75: When the size m×n of the output pixel block is larger than 1, a pixel of the original image is expanded into m×n pixels in the output image, so that there is no 1:1 correspondence between the address of the original image data memory X and that of the output image memory Xout. Therefore the address of the output image memory Xout is determined by the following equations, using the values of the color-separated image sub-memory calculated in steps 73, 74:

$$JX = m(x-1) + sx$$

$$JY = n(y-1) + sy$$

wherein
JX: output image memory column address
and JY: output image memory line address.

Steps 76, 77: The count of the output pixel block column counter is increased by one, and steps 73, 74, 75 and 77 are repeated until said count exceeds the column size m of the output pixel block.

Steps 78, 79: The count of the output pixel block line counter is increased by one, and steps 72, 73, 74, 75, 76, 77 and 78 are repeated until said count exceeds the line size n of the output pixel block.

(3)-1 Directional random mosaic process 1

At first there will be explained a first directional random mosaic process, with reference to FIGS. 4-1, 4-2 and 4-3:

Step 81: The color-separated image data prepared in the painting-like color reproduction process explained above are stored in a memory Xout(JX, JY, JZ), wherein JX=1, JX=2 and JX=3 respectively indicate red, green and blue components of the image data. The memory Xout (JX, JY, JZ) stores the data obtained by processing the original image data X(Xa, Ya, Za), so that the amount of data in the memory Xout is nine times that of the data in the memory X when a pixel is expanded to 3×3 times.

Step 82: The directional image data prepared in the directionality extraction process shown in FIG. 2-5 are stored in a memory $X_D$(xa, ya).

Figure 9:
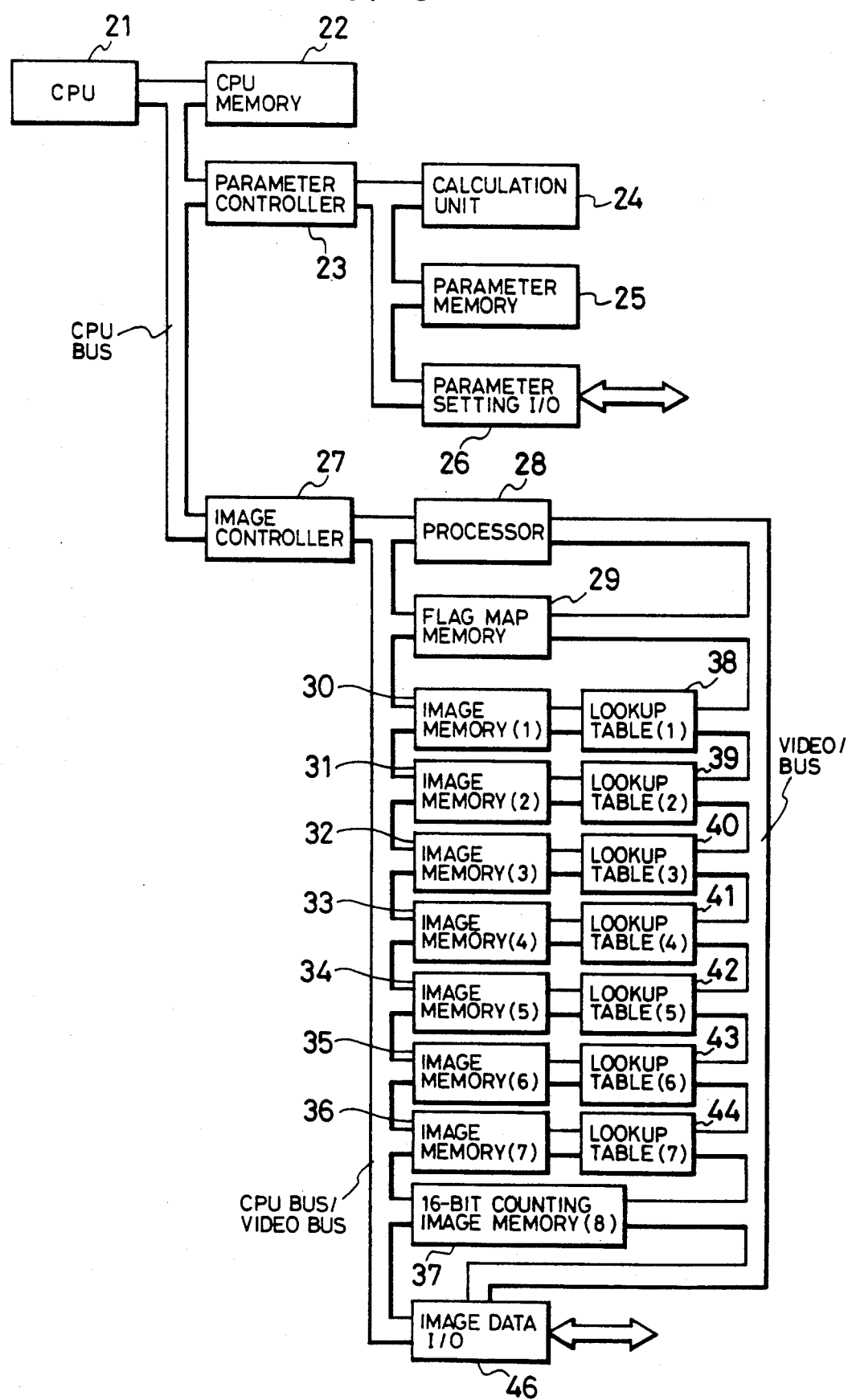
FIG. 9 is a block diagram showing the details of a part of the image processing unit shown in FIG. 1.

Step 83: Parameters required for calculation are set in this step. At first a classification number of the mosaic pattern, stored in a parameter memory in advance, and the pixel block size m', n' are entered. FIG. 4-2 shows, as an example, a pixel block with a block size m'×n'=5×5 containing a roughly oval mosaic pattern oriented in different directions. In FIG. 4-2, 9 pixels are at "1" in the block of 5×5 pixels, but this is not essential. Then, the area ratio of the blocks in the image is entered. For example, if an area ratio of 80% is desired, the operator enters a figure "80" via the keys of a keyboard, whereby the number of generations of the mosaic pixel block is determined by the following equation:

$$NSTOP = (JX/m') \times (JY/n') \times p/100$$

wherein
JX, JY: color-separated image size
m40 ,n': mosaic pixel block size
p: key-entered area ratio (%) and
NSTOP: number of generated mosaic pixel blocks.

Step 84: The count of a mosaic pixel block generating counter is set to "1".

Step 85: Central value ($x_R$, $y_R$) for arranging the mosaic blocks is determined by a random number generation. The range of the random number is so controlled that the value $x_R$, $y_R$ is positioned within the image area. In the present embodiment, said control is conducted to satisfy $x_R \leq JX$ and $y_R \leq JY$.

Step 86: There is calculated the memory address of the directional image data, corresponding to the central value ($x_R$, $y_R$) for arranging the mosaic blocks, determined in step 85. In the painting-like color reproduction, a pixel of the original image is expanded to a block of m×n pixels. In case of m=1 and n=1, the original image has a 1:1 correspondence with the color-separated image, and therefore with the directional image data. However, in case of m>1, n>1, the color-separated image is expanded and does not have a 1:1 correspondence with the directional image data. Consequently, the memory address ix, iy of the directional image data corresponding to the central value ($x_4$, $y_R$) is calculated by the following equations:

$$ix = x_R/m, \ iy = y_R/n$$

Step 87: The directional image data $X_D$(ix, iy) at the address ix, iy determined in step 86 is taken as the directional data of the central value of the mosaic block.

Step 88: A mosaic pixel pattern corresponding to the directional data is obtained from the parameter memory. FIG. 4-2 shows examples of directional data and mosaic pixel pattern.

Step 89: Output mosaic pixel data are determined from the mosaic pixel pattern and the color-separated image data, and are supplied to the color-separated image data memory, as will be explained in the following with reference to FIG. 4-3.

FIG. 4-3 shows a case of directional data "0", corresponding to a mosaic pixel pattern of 5×5 pixels having a directionality of 45° from front left to back right as shown by (b). Each pixel "1" in the pixel pattern is given the value of the color-separated image data at the coordinate ($x_4$, $y_R$) while each pixel "0" is given the value of the original image.

In the present invention, the mosaic process means replacing the value of plural pixels in a block with a representative value in said block.

Step 810: The count of the mosaic pixel block generating counter is increased by one.

Step 811: The directional random mosaic process is terminated after the process is repeated by the number of times of generations of the mosaic blocks.

In this manner there can be reproduced an image with the directionality of the touches of painting brush (3)-2 Directional random mosaic process 2

In the following there will be explained another embodiment constituting a modification to the aforementioned first directional random mosaic process.

Painters often undercoat the canvas uniformly with a color which is the principal color in the picture to be painted. In the present embodiment, therefore, there is conducted the following undercoat processing as a preliminary step for the mosaic processing.

(a) The operator estimates a main object in the original image, and prepares an object mapping image data by giving a value "1" to said object for example with a digitizer and a value "0" in the remaining area; and (b) In the background area, classified as outside the main object in the original image, histograms are prepared for the red, green and blue components, and the peak values of said histograms are taken as the representative values BR, BG, BB of the background.

In this manner there can be obtained the mapping image data of the main object and the representative values BR, BG, BB of the background. These data are utilized in a directional random mosaic process to be explained in the following, to obtain an effect that the background uniformly coated with said representative color of the background can be seen through the gaps between the mosaic blocks. In this manner there is obtained an image more realistically resembling a painting.

In the following there will be explained said directional random mosaic processing 2, with reference to FIGS. 4-4, 4-2 and 4-5, in which the same steps as in FIG. 4-1 are represented by the step numbers:

Step 81: The color-separated image data, prepared by the aforementioned painting-like color reproduction processing are stored in the memory Xout (Jx, Jy, Jz), wherein Jz=1, Jz=2 and Jz=3 respectively indicate the red, green and blue components of the image data. Said memory Xout stores the data obtained by processing the original image data X(Xa, Ya, Za), and the amount of said processed data is nine times the original image data X if a pixel is expanded to 3×3 pixels.

Step 82: The directional image data prepared by the directionality extraction process are stored in the memory $X_D$(Xa, Ya).

Step 821: The main object mapping image data explained above are supplied to a memory M(Xa, Ya).

Step 83: Parameters required for the calculation are set in this step. At first a classification number of the mosaic pattern, stored in a parameter memory in advance, and the pixel block size m', n' are entered. FIG. 4-2 shows, as an example, a pixel block with a block size m'×n'=5×5 containing a relatively oval pattern oriented in different directions. In FIG. 4-2, nine pixels are at "1" in the block of 5×5 pixels, but this is not essential. It is also possible to determine the number of generations of the blocks from the area ratio as already explained in relation to FIG. 4-1.

Step 84: The count of the mosaic pixel block generating counter is set to "1".

Step 85: The central value ($x_4$, $y_R$) for arranging the mosaic blocks is determined by a random number generation. The range of the random number is so controlled that the value $x_4$, $y_R$ is positioned within the image area. In the present embodiment the control is so conducted to satisfy conditions $X_R \leq JX$ and $Y_R \leq JY$.

Step 86: There is calculated the memory address of the directional image data corresponding to the central value ($x_4$, $y_R$) for arranging the mosaic blocks, determined in step 85.

In the painting-like color reproduction, a pixel of the original image is expanded to a block of m×n pixels. In case of m=1 and n=1, the original image has a 1:1 correspondence with the color-separated image, and therefore with the directional image data. However, in the case of m>1, n>1, the color-separated image is expanded and does not have a 1:1 correspondence with the directional image data. Consequently, a memory address ix, iy of the directional image data corresponding to the central value ($x_4$, $y_R$) is calculated by the following equations:

$$ix = x_R/m, \quad iy = y_R/n$$

Step 87: The directional image data $X_D$(ix, iy) at the address ix, iy determined in step 86 is taken as the directional data of the central value of the mosaic block.

Step 88: A mosaic pixel pattern corresponding to the directional data $I_{direction}$ is obtained from the parameter memory. FIG. 4-2 shows examples of directional data and mosaic pixel pattern.

Step 880: If the content of the main object mapping image data M(ix, iy) at the address ix, iy determined in step 86 is "1", this position is identified as a part of the main object, and the mosaic processing for the main object is executed. On the other hand, if said content is "0", this position is identified as a part of the background and the mosaic processing for the background, is executed.

Step 881: When the background area is identified by step 880, there is executed the mosaic process for the background area, which will be explained with reference to FIG. 4-5.

FIG. 4-5 shows a case of directional data "0", corresponding to a mosaic pixel pattern of 5×5 pixels having a directionality of 45° from front left to back right as shown in (b). Each pixel "1" in the pixel pattern is given the value of the color-separated image data at the coordinate ($x_4$, $y_R$) while each pixel "0" is given the background representative value BR, BG, BB obtained in the aforementioned undercoat process, or the color-separated image data shown in (d).

Step 882: When the main object area is identified by step 880, there is conducted the mosaic processing for the main object area, which will be explained with reference to FIG. 4-3.

Each pixel "1" in the pixel pattern is given the value of the color-separated image data at the coordinate ($x_4$, $y_R$) while each pixel "0" is given the original image data, or the color-separated image data shown in (c).

Steps 810, 811: The count of the mosaic pixel generating counter is increased by one. The directional random mosaic processing is terminated after the process is repeated a number of times equal to the number of generations of the mosaic blocks.

As the result of the above-explained procedure, the uniform undercoat can be seen through the gaps between the mosaic blocks in the background area, thus more realistically imitating a painting (see FIG. 20-2).

The number of divided areas is not limited to two but can be selected larger.

(4) Mosaic processing with complementary color in dark image portion

In the following there will be explained the complementary color mosaic processing for the dark image portion, while making reference to FIGS. 4-6 and 4-7.

In these flow charts, the same steps as those in FIG. 4-1 are represented by the same step numbers, and only the different steps will be explained in the following.

Step 82': The monochrome image data shown in FIG. 2-4 are stored in the monochrome image memory Xw(Xa, Ya), since the luminosity information is required for identifying the dark image portion.

Step 83': Parameters are set in this step. A first parameter is the threshold value DP for identifying a dark portion, to be entered from a command input unit such as a keyboard. The entry may be made directly by the luminosity or by the proportion of the image area to be identified as the dark portion, from which the threshold luminosity can be obtained based on the histogram of the image. Another required parameter is the number NSTOP' of the generation of dark portion mosaic blocks. The entry of said parameter may be made, through the command input unit such as a keyboard, either directly by said number, or by a proportion (for example 30 or 50%) to the number NSTOP of generation of mosaic blocks determined in the step 83 shown in FIG. 4-1.

Step 86': There is discriminated whether the luminosity Xw(ix, iy) of a random coordinate prepared in step 85 is lighter or darker than the dark portion threshold level DP, and, if lighter, the generation of random coordinate is repeated until a darker portion is selected.

Step 88': For executing the complementary color mosaic processing, there is determined the complementary color of the color of the color-separated image data at the coordinate $(x_4, y_R)$. The control sequence for determining the complementary color is shown in FIG. 4-7, in which the R, G and B colors are converted into hue (H), luminosity (L) and saturation (S) (step 813), then the hue is inverted by 180° (step 814), and thus inverted hue luminosity and saturation are again converted into the signals R, G and B (step 815). The conversion from R, G, B into H, L, S, and inverse conversion can be achieved by known matrix calculations. In the foregoing explanation, the complementary color is obtained from the color-separated image data after directional random mosaic process, but the complementary color may also be obtained from the original color-separated image data prepared according to the flow chart shown in FIG. 3-2.

Step 89': A directional random mosaic process is conducted with the complementary color determined in the step 88'. This process is the same as the process of step 89 shown in FIG. 4-1, except that the used color is the complementary color.

Step 811': Steps 85 to 810 are repeated NSTOP' times.

Thus there is conducted the directional random mosaic process, with dots of the complementary color only in the dark portion. In this manner there is obtained an image in the style of pointilism, faithful to the concept of the neo-impressionism.

In the foregoing there has been explained the process of conversion with an image processing apparatus of successive process. In the following there will be explained the process with an apparatus capable of parallel processing.

The parallel processing in the present embodiment provides a result the same as that in the aforementioned successive processing, but provides a higher processing speed.

At first reference is made to flow charts shown in FIGS. 5-1 and 5-2, for explaining the control sequence of the directionality extraction process when conducted with an image processing apparatus capable of parallel processing:

Step 91: Original image data are stored in the memory X (Xa, Ya, Za), wherein Za=1=R, Za=2=G and Za=3=B, respectively representing red, green and blue components of the image.

Step 92: All the values of the pixels are multiplied by ⅓.

Step 93: The values of R, G, B are added to obtain monochrome image data, which are stored in the monochrome image memory Xw(Xa, Ya). In this manner the monochrome image data can be obtained. Said data is subjected, in following steps 94-904, to the extraction of four direction, i.e., vertical, horizontal, and two 45° directions.

Step 94: The content of a direction counter D is set to "0".

Step 95: As shown in FIG. 5-3, indicating a case of differential calculation in a window of 7×7 pixels, the content of the monochrome image memory Xw(Xa, Ya) is so shifted that the position of $P_1(D)$ ($P_1(0)$ at the upper left corner of the window in this case) moves to the position of the central pixel 0. This corresponds to a shift of 3 pixels to right and 3 pixels to below in case of the window of 7×7 pixels shown in FIG. 5-3. Then the values of thus shifted monochrome image memory Xw(Xa, Ya) are given to a differential calculation memory X(D) (Xa, Ya).

Step 96: Then the content of the monochrome image memory XW(Xa, Ya) is so shifted that the position of P2(D) (in this case P2(0) at the lower right corner) moves to the position of the central pixel 0. This is achieved by a shift of 6 pixels to left and 6 pixels to above, since the pixel $P_1(0)$ is moved to the position of the central pixel 0 in step 95. Then there is calculated the absolute value of the difference between the values of the shifted monochrome image memory Xw(Xa, Ya) and the differential calculation memory X(D) (Xa, Ya) (now X(0) (Xa, Ya)), and the obtained absolute value is again stored in the differential calculation memory X(D) (Xa, Ya).

Steps 97, 98: The value of D is increased by one (i.e. D=1). Then the sequence returns to step 95 to effect the differential calculation in the vertical direction (from $P_1(1)$ toward $P_2(1)$), and the result is stored in the differential calculation memory X(1) (Xa, Ya). Calculations are also made in the directions (2) and (3).

Step 99: A maximum value is determined from the values of the differential calculation memories X(0) (Xa, Ya)−X(3) (Xa, Ya) and is stored in a memory Xmax(Xa, Ya).

Steps 901-904: The value of the Xmax(Xa, Ya) determined in the step 99 is compared with the values of the memory X(D) (Xa, Ya) (D=0, 1, 2, 3), and the values of D where the value of X(D) (Xa, Ya) coincides with Xmax(Xa, Ya) are stored in the directional image data memory $X_D$(Xa, Ya). More specifically, a value "0" is given in the directional image memory $X_D$(Xa, Ya) for a pixel where the value of X(D)(Xa, Ya) coincides with Xmax(Xa, Ya), and a value "1" is given for a pixel where the value of X(1)(Xa, Ya) coincides, and this procedure is repeated up to D=3.

The directional image data are completed in this manner. As explained in the foregoing, parallel processing can achieved a very high speed, since all the pixels can be processed at the same time.

In the following there will be explained the painting-like color reproduction conducted by parallel processing, with reference to a flow chart shown in FIG. 6-1:

Step 101: There is determined the number i of colors to be used. Said number i is entered by the operator through the command input unit, such as a keyboard. For example, for i=3, there are obtained 27 combinations of R, G and B.

Step 102: According to the number of colors determined in the step 101, there is prepared a look-up table for converting an actual memory value into a desired value. More specifically, the look-up table for red color will be as follows:

$R(1)$ for $X_{min} < X < \frac{1}{2}(R(1)+R(2))$ $R(n)$ for $\frac{1}{2}(R(n-1)+R(n)) < X < \frac{1}{2}(R(n)+R(n+1))$ wherein $2 < n < i-1$ $R(i)$ for $\frac{1}{2}(R(i-1)+R(i)) < X < X_{max}$ wherein Xmin and Xmax are respectively the minimum and maximum of the memory values; for example, Xmin=0, Xmax=255 for 8 bits.

Figures 1, 4:
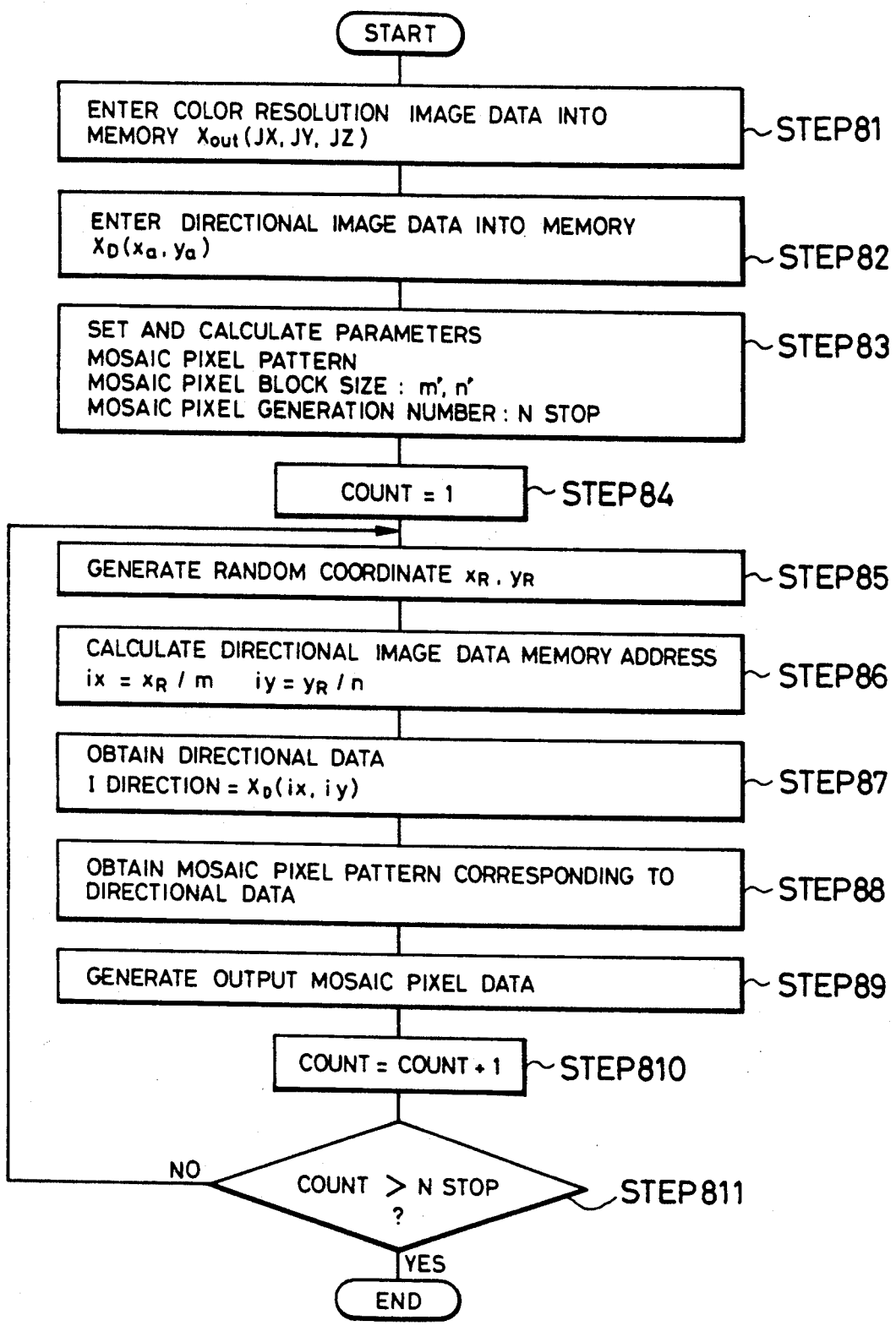
Figures 2, 4:
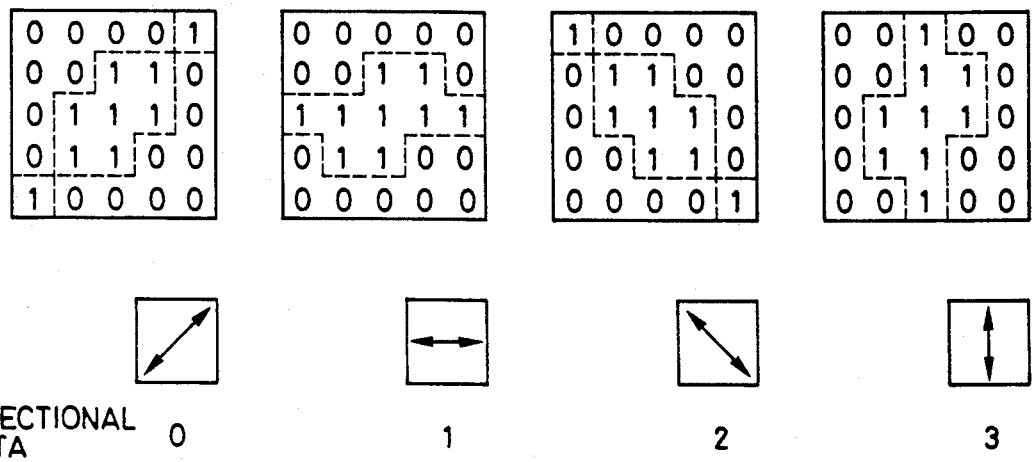
Figures 3, 4:
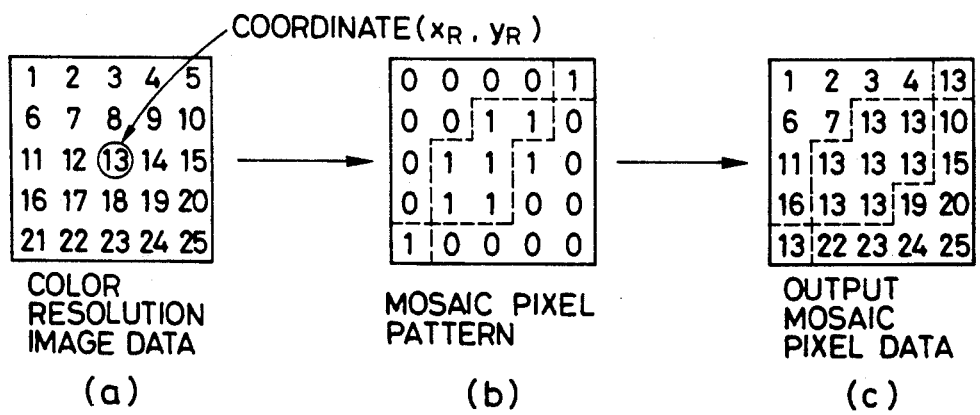
Figures 4, 5:
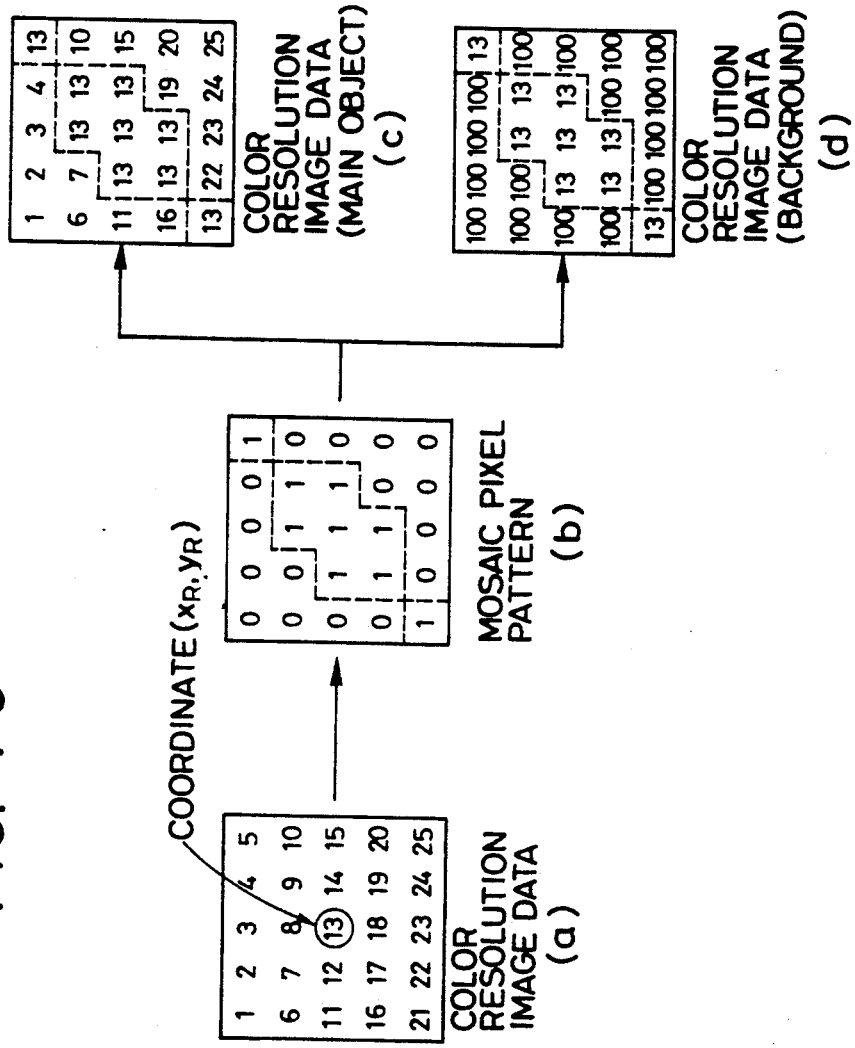
Figures 4, 5, 6:
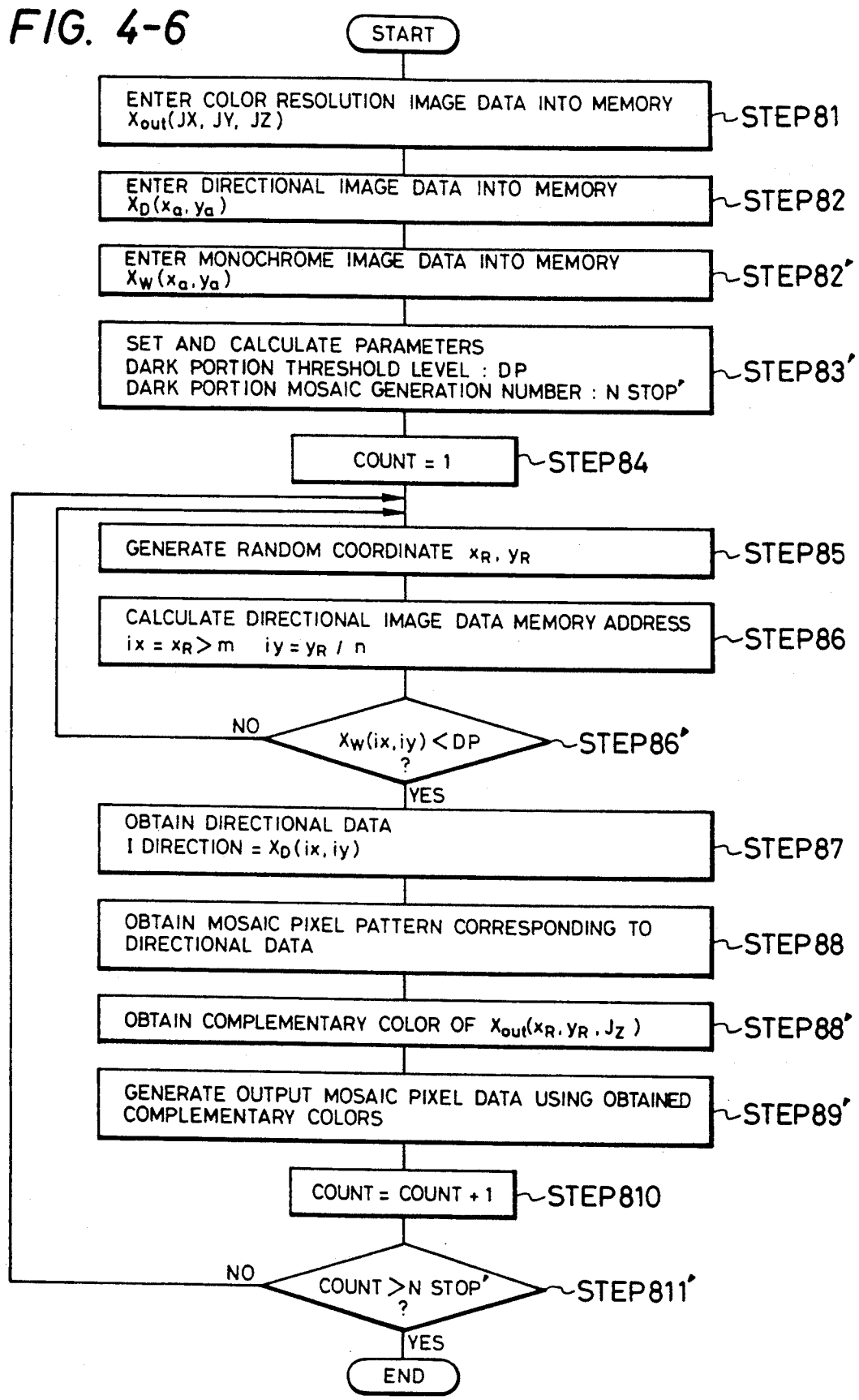

Consequently the color which originally appears as shown in FIG. 6-2 will be reproduced with a limited number of colors as shown in FIG. 6-3, in which a case of i=3 is shown.

Step 103: The operator enters, via the command input unit such as a keyboard, the size m×n of the color-separated image output pixel block (by entering m and n, for example). For example, in case of m=3, n=3, a pixel of the original image is released as a pixel block of 3×3 pixels by the color separation process to be explained later.

Step 104: The original image data are stored in the memory X(xO,yO,zO). However, in parallel processing, processing cannot be made between different memory sizes. Consequently the original image data are expanded m x n times in advance (by storing the same values m times laterally and n times in a column to facilitate the subsequent processing. Step 107: The values stored in the memory X(xO, yO, zO) are converted through the look-up table determined in the step 102, and again stored in said memory X. In this manner said values are converted into the colors of the initially designated number. Steps 108, 109: If the values of R, G, B become mutually equal as the result of the step 107, a bias is added to the value B. This corresponds to step 69 in FIG. 3-2 in the first embodiment.

Step 110: In order to compensate, in a succeeding process, the error between the color determined in the steps 107, 109 and the actual color, the difference between the contents of the memory X(XO, YO, ZO) and the work memory Xw(XO, YO, ZO) is added to said memory X.

Step 111: In order to randomly arrange the thus selected color, random coordinates are generated one by one in the window of m×n pixels and are stored in the random memory $X_R$(xO, yO). If a generated coordinate is identical with one of the already generated coordinates, generation of random coordinate is repeated in order to avoid duplication. This is similar to steps 73, 74 in FIG. 3-3.

Step 112: The values of the work memory Xw(xO, yO, zO) corresponding to the random coordinates selected in the step 111 are stored in the output image memory Xout (xO, yO, zO).

Steps 113, 114, 115, 116: The above-explained procedure is repeated m×n times.

In the above-explained procedure, the original image is expanded m×n times, and is converted into the selected colors. In an apparatus capable of parallel processing, the conversion with the look-up table can be conducted simultaneously for all the pixels so that the processing speed is very high.

Figures 4, 5, 6, 7:
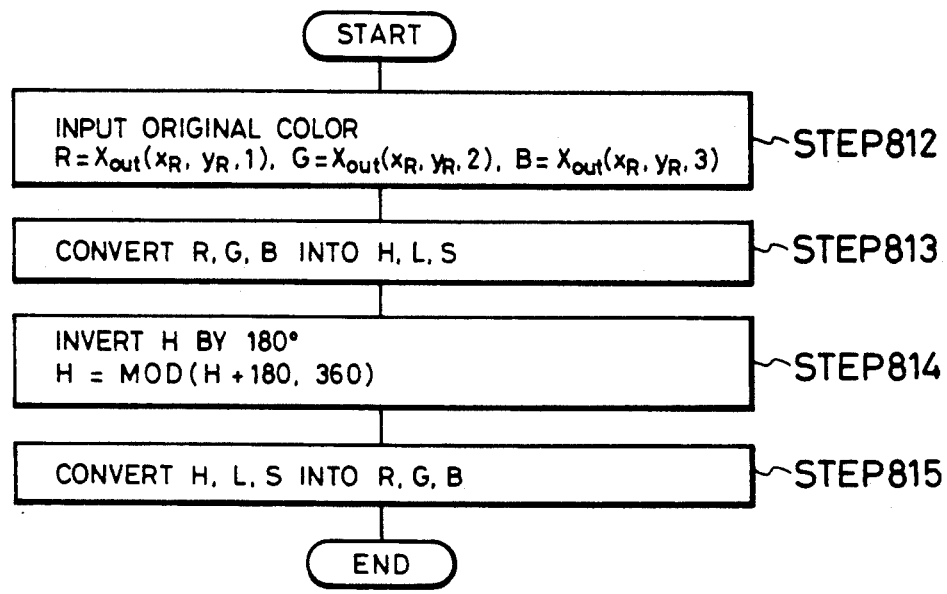
Figures 1, 5:
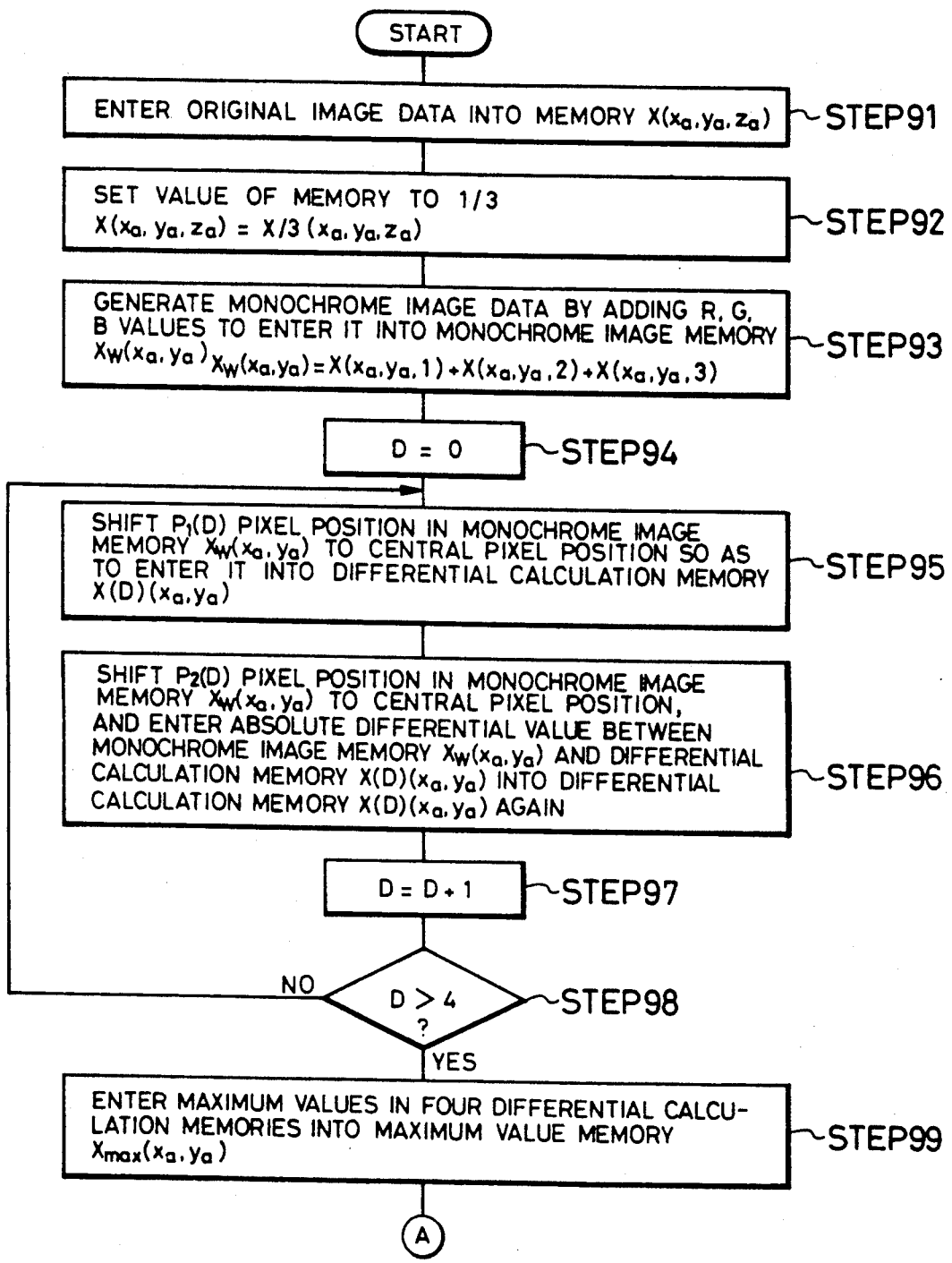
Figures 1, 6:
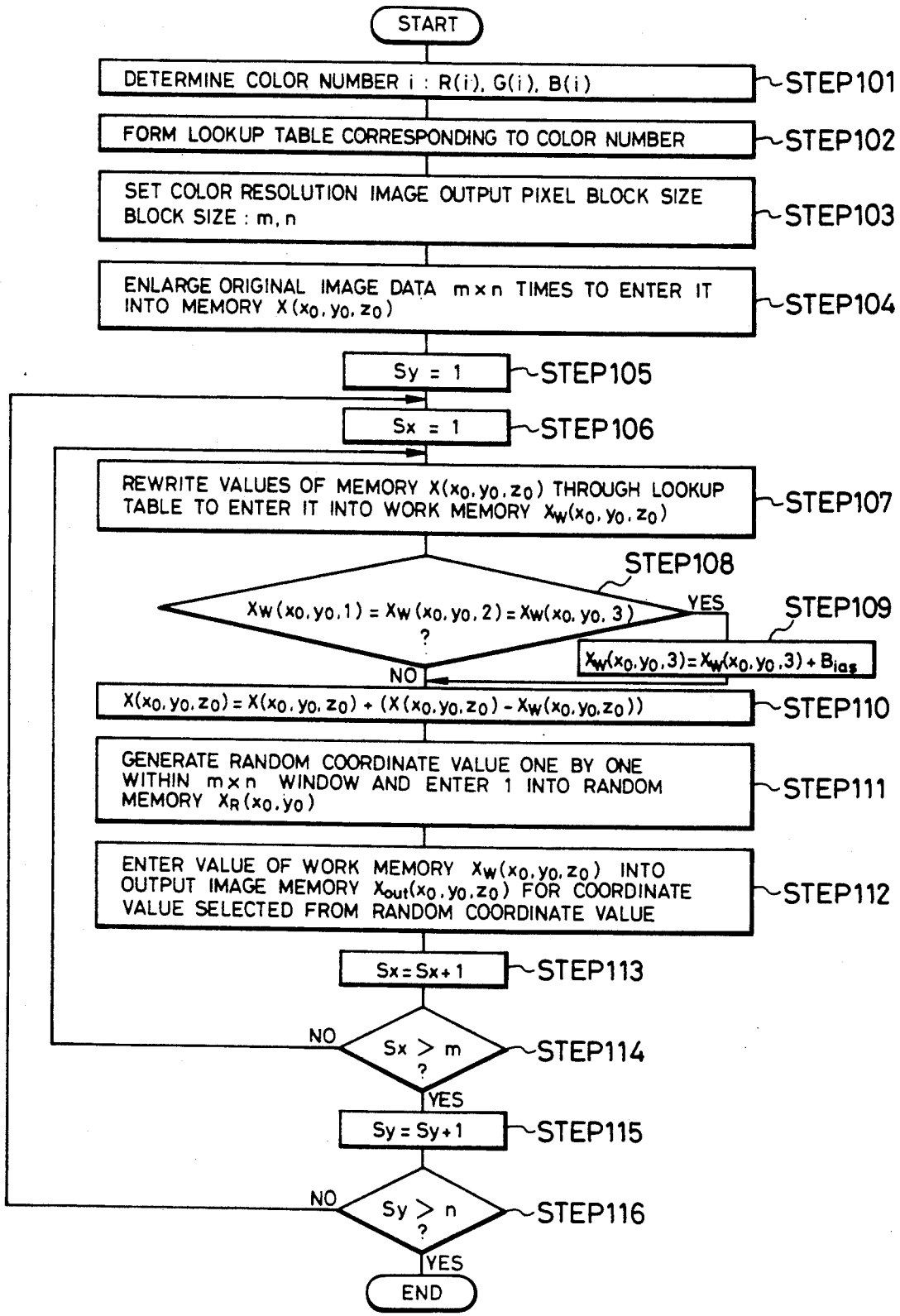
Figures 2, 6:
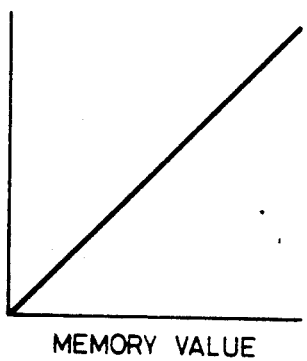
Figures 3, 6:
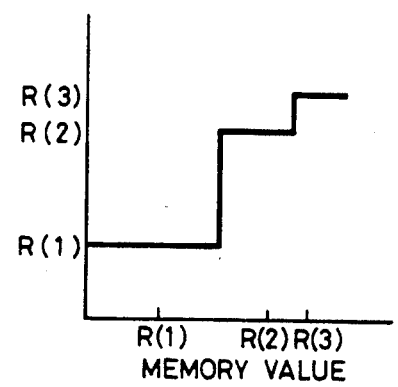
Figures 1, 7:
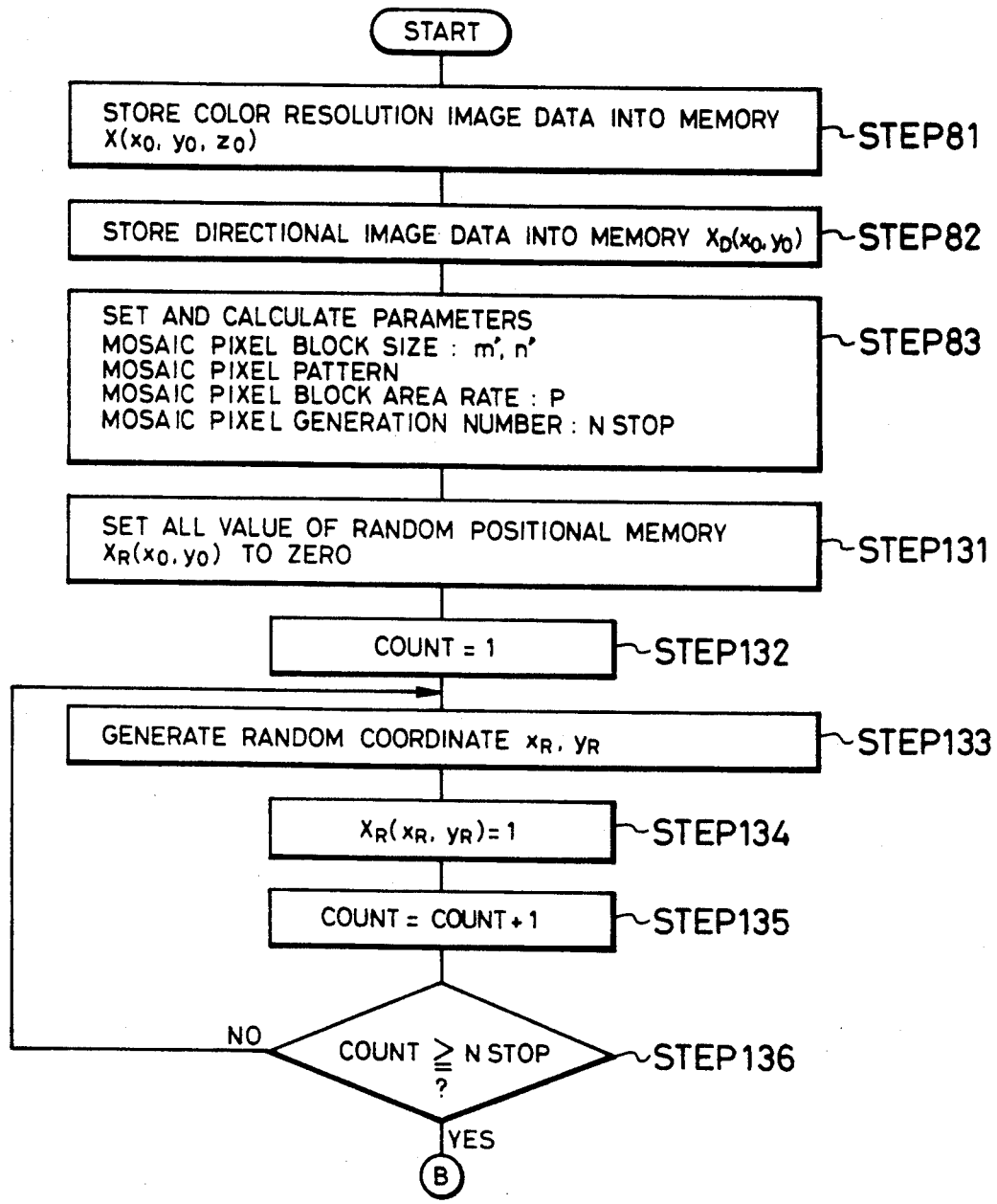
Figures 2, 7:
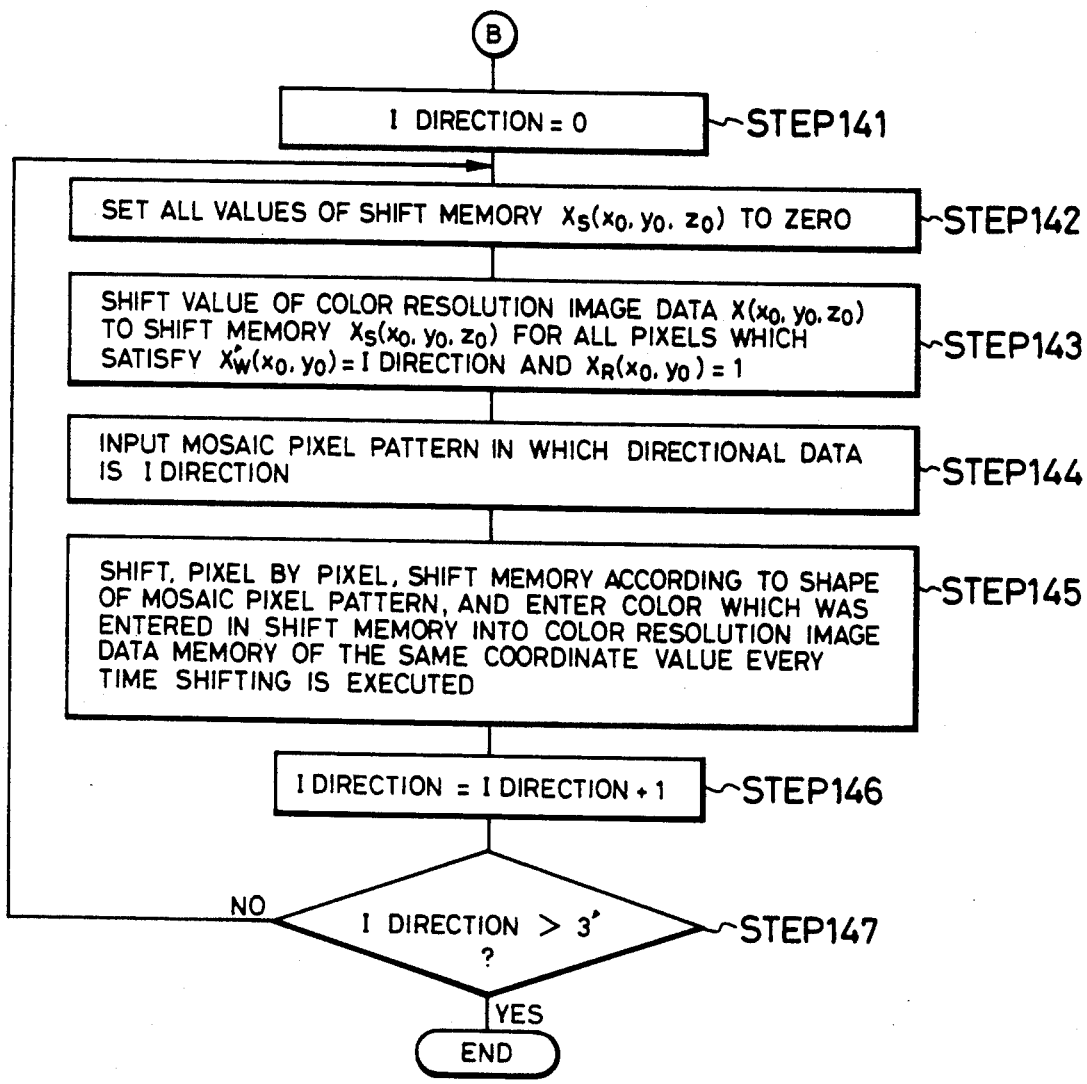
Figures 6, 7:
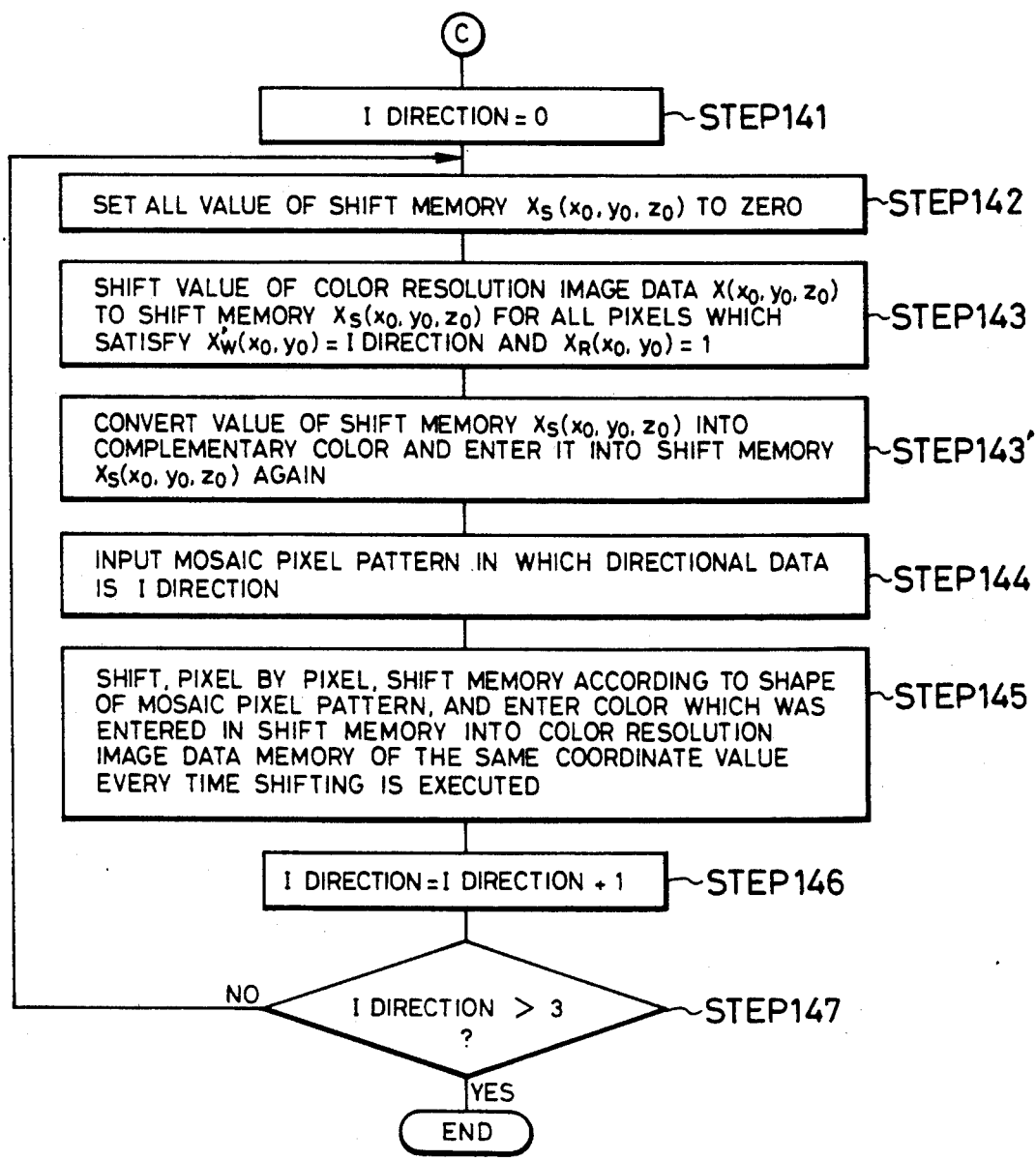

Now reference is made to flow charts shown in FIGS. 7-1 and 7-2, for explaining the directional random mosaic processing by an image processing apparatus capable of parallel processing, wherein the same process steps as those in the foregoing first embodiment are represented by the same step numbers and will not be explained further.

Step 82: The directional image data, prepared by the directionality extraction process, are stored in a memory $X_D'$(xO, yO). However, since parallel processing is not possible between different memory sizes, the directional image data are also expanded m×n times (by repeating the same value m times laterally and n times vertically) to obtain a same memory size as that of the color-separated image data. Steps 131-136 are used to generate all the random coordinates in advance, in order to fully exploit the advantage of the parallel processing.

Step 131: A random position memory $X_R$(xO, yO) for storing the randomly generated coordinates is reset to zero. Said random position memory $X_R$ can have a capacity of only one bit, since it is only required to identify the on-off state of the random coordinate.

Step 132: A counter COUNT for counting the number of the random coordinates is set to "1".

Step 133: A coordinate positioned is determined by generating a random coordinate. This step is identical with step 85 in the aforementioned first embodiment.

Step 134: The content of the random position memory is shifted to "1", corresponding to the generated random coordinate $x_R$, $x_R$.

Step 135: The content of the counter COUNT, for counting the number of the random coordinates, is increased by one. .

Step 136: The sequence from step 133 to step 135 is repeated until the count of the counter COUNT, for counting the number of the random coordinates, reaches NSTOP, and, when said count NSTOP is reached, the sequence proceeds to the next step.

Steps 141-147 are used for processing each of the direction data, corresponding to the random coordinates prepared in steps 131-136.

Step 141: The directional data $I_{DIRECTION}$ is set to "0", whereby is conducted for a 45° direction from front left to back right.

Step 142: In the parallel processing, the pixel values are synthesized with simultaneous shifting. A shift memory Xs(xO, yO, zO) used for this purpose is set to zero.

Step 143: There is selected a coordinate value for which the random position memory $X_R$(xO, yO) has a content "1"(indicating that it is a random coordinate) and for which the directional image data Xw'(xO, yO) is $I_{direction}$ (presently "0"). In this manner there is selected a random coordinate to be processed along the 45° direction, and, for the thus selected coordinate, the color value of the color-separated image data X(xO, yO, zO) is shifted to the shift memory Xs(xO, yO, zO).

Step 144: A mosaic pixel pattern, for which the directional data is $I_{direction}$ (which is "0"in the present case), is selected from a file prepared in advance. FIG. 7-3 shows an example of a mosaic pixel pattern of said direction with 7×7 pixels, in which the mosaic process is conducted for the pixels "1" but the original color remains in the pixels "0".

Step 145: The shift memory is moved to each pixel position to be processed in the mosaic pixel pattern, and, at each pixel position, the color information stored in the shift memory is stored in the color-separated image memory corresponding to said position. This procedure will be explained in more detail with reference to FIG. 7-4, with reference to the mosaic image pattern of 7×7 pixels shown in FIG. 7-3. The color information stored in the shift memory at first is that of the central position (pixel position "0") in the mosaic image pattern. Then said shift memory is shifted, rightward by 1 pixel and upward by 3 pixels, to a first pixel position (pixel position "1") of the mosaic pattern. At this position the color stored in the shift memory is transferred to the color-separated image data memory, so that the color of the pixel "0" is also placed at the pixel "1". Then said shift memory is moved, by 1 pixel to right, to a pixel position "2", and, at this position, the color stored in the shift memory is transferred to the color-separated image data memory. In this manner the color of the pixel "0" is also placed at the pixel "2". The color of the central pixel is placed in all the pixels designated by the mosaic pixel pattern, by repeating the above-explained procedure to the pixel "28".

Step 146: The directional data $I_{direction}$ is increased by one so that $I_{direction}$ becomes equal to "1".

Step 147: The sequence returns to the step 142 to execute the process for the directional data "1" (horizontal direction).

The above-explained procedure is repeated until the direction data exceeds 3. As explained above, an apparatus capable of parallel processing greatly reduces the processing time in comparison with the case of mosaic processing for one random coordinate at a time, since several or all of the mosaic processings for a given directional data can be executed at a time.

Now reference is made to flow charts shown in FIGS. 7-5 and 7-6 for explaining the complementary color mosaic processing for a dark portion. As in the foregoing first embodiment, this flow resembles that of the directional random mosaic processing. Consequently, in the following, there will only be explained parts which are different from the flow of the directional random mosaic processing shown in FIGS. 7-1 and 7-2.

Step 82″: The monochrome image data prepared in the step 93 shown in FIG. 5-1 are stored in the monochrome image memory $X_w$,(xO, yO), since the luminosity information is required for identifying the dark portion.

However, since parallel processing cannot be conducted between the different memory sizes, the monochrome image data are also expanded m×n times (by repeating same values m times in the horizontal direction and n times in the vertical direction) to obtain the same memory size as that of the color-separated image data.

Step 83′: Parameter setting is conducted in this step. A first necessary parameter is the threshold level DP for identifying a dark portion, which is entered through the command input unit, such as a keyboard. Said entry may be made either directly with reference to the luminosity, or to the proportion of image area to be identified as the dark portion, from which the threshold level is calculated based on the histogram of the image values. Another required parameter is the number NSTOP′ of generation of the dark portion mosaic blocks. Said number is also entered via the command input unit, but, in the present embodiment one must take into consideration the regulation of the number of dots in step 137 to be explained later, according to the proportion of the dark portion with respect to the entire image area.

Step 136′: Steps 133 to 135 are repeated until random coordinates are generated equal in number to NSTOP′.

Step 137: Among the random coordinates equal in number to NSTOP′ stored in the memory $X_4$(xO, yO), those which are in a lighter portion than DP in $X_w$(xO, yO), are cancelled. Consequently, the complementary color mosaic processing is conducted thereafter only in a portion lower in luminosity than DP.

Step 143′: The values in the shift memory $X_s$(xO, yO) are converted into complementary colors and are again stored in said shift memory $X_s$(xO, yO). Conversion to complementary colors can be achieved either by parallel processing or by the flow shown in FIG. 4-7. In this manner the shift memory $X_s$ storing the complementary colors is moved according to the mosaic patterns, and the complementary colors are placed on the color-separated image data memory x(xO, yO, zO).

Parallel processing can thus complete the processing within a short period, since the randomly generated coordinates can be processed several or all at a time. The foregoing embodiments provide the following advantages:

(1) The directionality given to the mosaic blocks enables one to reproduce the directionality of the original image, in comparison with the conventional uniform mosaic blocks;

(2) Color reproduction can be made in a more painting-like manner;

(3) In a dark portion with low luminosity, the reproduction with pointilism is not conducted with dark colors but by the use of complementary colors. Thus, a realistic painting-like image can be obtained, and even an unskilled person can produce a picture in the style of neo-impressionism;

(4) The mosaic blocks can be made less conspicuous by converting the information of a pixel of the original image into plural pixels, and randomly arranging the thus-converted plural pixels;

(5) A painting-like color reproduction can be obtained by converting the information of a pixel of the original image into color information of plural colors, and, if the thus converted color information has a certain proportion, increasing the proportion of a predetermined color in said color information with respect to the proportion of other color information;

(6) In the conversion of the information of a pixel of the original image into the information of plural pixels, it is possible to minimize averaging error;

(7) It is possible to provide a novel image that cannot be expected from the conventional "darkroom process" relying on the silver-based photographic system and to increase the freedom of image preparation; and (8) It can be used as laboratory service equipment, as the image processing can be made without manpower.

In the following there will be explained another embodiment.

FIG. 8 is a block diagram showing an example of the flow of density signal when the present invention is applied to a color scanner. An input signal, obtained by photoelectrically scanning an original film mounted on an input drum 11, is converted into a density signal by a logarithmic converting circuit 12, and is supplied through an A/D converter 13 to an input signal processing unit 14, which converts the density value according to the kind of photographic film so as to obtain a predetermined relationship with respect to the amount of exposure of said film. This is because the characteristic curve of the film is different for a negative film, a positive film and a reversal film, and, in the case of a color image, is different for red, green and blue colors, particularly in a negative film. Then the signal is supplied to an image processing unit 15, constituting the most important part of the system, for digital image processing. The density signal released from the image processing unit 15 is converted, in an output signal processing unit 16, into a control signal for controlling the intensity of a laser beam, and is supplied through a D/A converter 17 to a modulator 18 for modulating a laser beam emitted from a light source 19, thereby reproducing a desired image on an output drum 20.

FIG. 9 is a block diagram showing the details of a part of the image processing unit 15. A CPU 21 controls the entire image processing unit 15 and executes the image processing utilizing a CPU memory 2. A parameter controller 23 controls a calculation unit 24, a parameter memory 25 and a parameter setting I/O port 26 and executes the initialization, setting, comparison, etc., of the parameters required for the processing. A processor 28 is connected to the CPU through an image controller 27 and is operated by the instruction of the CPU 21. Said processor 28, constituting the nucleus of the image processing unit 15, receives image data from and sends the processed image data to image memories 30–36, 16-bit accumulating image memory 37 and an image data I/O port 46, selected arbitrarily by instructions from the CPU 21. It can also send a signal to a flag map memory 29, constituting an exclusive memory for carry flags, for setting a carry flag therein. The image memories 30–36 and the 16-bit accumulation image memory 37 are connected to a CPU bus and a video bus, so that direct data writing into or reading from said memories and real-time data processing between arbitrary memories can be achieved by the CPU 21. Said image memories are provided with look-up tables 38–44, composed of high-speed RAM's. Each said RAM has a structure of 256×8 bits, has 8 address lines (capable of designating addresses 0–255, or designating 256 density levels) connected directly to the outputs of each image memory, and has 8 data lines connected to the video bus. The content of each said RAM can be arbitrarily written and read by the CPU 21. The image data I/O port 46, constituting an interface for the image data, receives image data from the input signal processing unit 14 shown in FIG. 8, and supplies image data to the output signal processing unit 16.

Figure 10A:
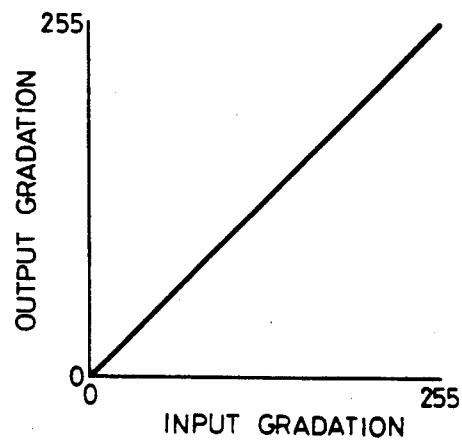
FIGS. 10A and 10B are charts showing the state of a look-up table to be employed in the flow chart shown in FIG. 11.
Figure 10B:
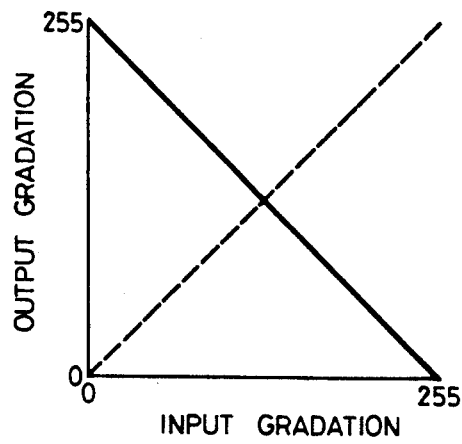

FIGS. 10A and 10B are charts showing the state of the look-up tables 28–34, wherein the abscissa and the ordinate respectively indicate the input gradation and the output gradation. FIG. 10A shows a standard state, in which addresses 0, 1, . . . , 255 are respectively given values 0, 1, . . . , 255 so that the output is identical with the input. On the other hand, FIG. 10B shows an inverted state in which addresses 0, 1, . . . , 255 are respectively given values 255, 254, . . . , 0 so that the density data is inverted between the input and the output.

Figure 11A:
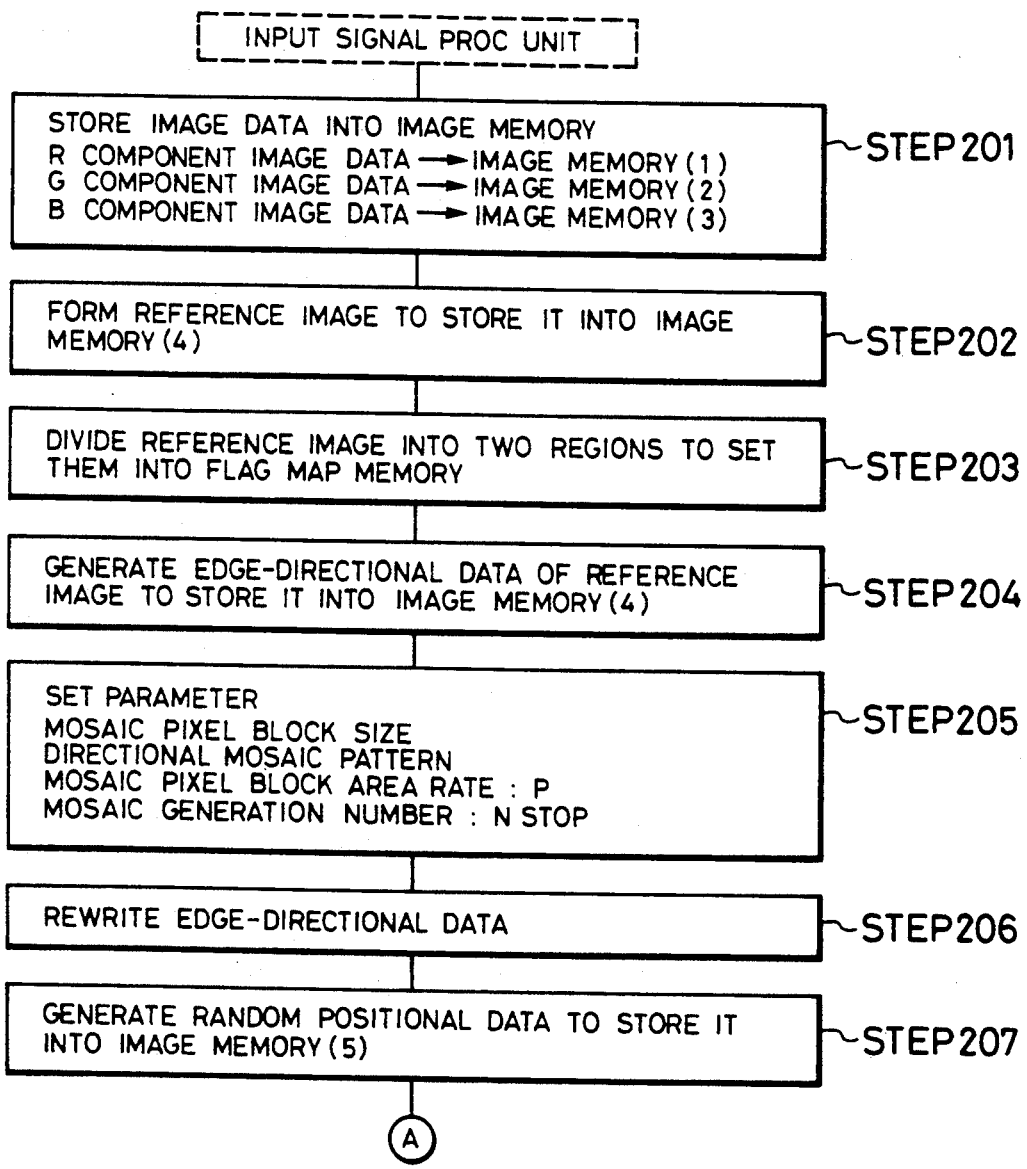

In the following there will be explained the digital image processing conducted in the image processing unit 15, while making reference to a flow chart shown in FIG. 11. In the following explanation the density data of the digital image is expressed as $a_i(m, n)$ in which i is R, G or B, respectively representing the red, green or blue component of the original image data. Each component in each pixel is composed of 8 bits, and is thus capable of representing 256 density levels, wherein a level $\phi$ indicates the highest (darkest) value while a level 255 indicates the lowest (lightest) value.

Step 201: In response to an instruction from the CPU 21, the processor 28 stores the R component data of the original image, received through the image data I/O port 46 and the input signal processing unit 14, in the image memory (1) 30. Then the G component data and B component data of the original image are respectively stored in the image memories (2) 31, (3) 32. At this point the look-up tables (1) 38–(7) 34 are in the standard state shown in FIG. 10A.

Step 202: This step prepares reference image data to be used in determining the directionality of image edges and stores said data in the image memory (4) 33. In the present embodiment, the R component data in the image memory (1), the G component data in the image memory (2) and the B component data in the image memory (3) are added in a ratio R : G : B = 3 : 6 : 1 to obtain monochromatic reference data close to the visual sensitivity but it is possible to use the G component data, to which visual sensitivity is highest, as the reference image data. The processor 28 resets the 16-bit image memory (8), then adds the content of the image memory (1) three times in said image memory (8), the content of the image memory (2) six times and the content of the image memory (3) once. If the content of the image memory (1), (2) or (3) is represented by $a_i(m, n)$, i = R, G, B and the content of the image memory (8) is represented by $a_8(m, n)$, there is obtained a relation $a_8(m, n) = 3 \times a_R(m, n) + 6 \times a_G(m, n) + a_B(m, n)$. The data in said image memory (8) are divided by 10 and are stored in the image memory (4).

Thus the data $a_4(m, n)$ in said image memory (4) are represented by $a_4(m, n) = (3 \times a_R(m, n) + 6 \times a_G(m, n) + a_B(m, n))/10$.

Step 203: The image data stored in the image memories (1), (2), (3) are copied into the image memories (6), (7), (8), and the image memories (1), (2), (3) are all reset to zero. Then the image data of the image memory (4) are copied into the image memory (2). Then all the bits of the flag map memory 19 are set to "1". In said image memory (2), a closed curve surrounding the main object area is drawn by an unrepresented digitizer attached to the parameter setting I/O port 26. The interior of said closed curve is subjected to a painting step and is defined as a first area (main object area). Then, corresponding to the pixel positions (i, j) in said area, value "0" is given the pixel positions (i, j) on the flag map memory 29. The area of the values "1" on the flag map memory 29 is defined as a second area (background area). Subsequently the data in the image memories (6), (7), (8) are returned to the image memories (1), (2), (3).

Step 204: FIG. 12 is a flow chart showing the details of this step 204. In step 204-1 the reference image data, stored in the image memory (4), is copied in the image memories (5), (6) and (7).

In step 204-2, the images $a_k(i, j)$ (k = 4, 5, 6, 7) stored in said image memories (4), (5), (6), (7) are subjected in succession to a known convolution process, utilizing direction detecting operators of window size of '3×3 pixels, shown by OP1–OP4 in FIG. 7, and the absolute values of the obtained results are again stored in the image memories (4), (5), (6), (7). The operator OP1 is used for detecting an edge from front left to back right; OP2 is for detecting a horizontal edge; OP3 is for detecting an edge from front right to back left; and OP4 is for detecting a vertical edge.

In step 204-3, the values of the image memories (4), (5), (6), (7) are compared for each pixel position (i, j) and the number of an image memory having the largest value is identified. For example, if the value $a_4(i, j)$ of the image memory (4) is larger than other corresponding values $a_k(i, j)$ (k=5, 6, 7), it means that a block area of 3×3 pixels around this position contains a large edge component of a 45° diagonal direction from front left to back right. Thus a value "1" is written in the position (i, j) of the image memory (4), and the value $a_4(i, j)$ is written in the image memory (5).

Similarly, if a value $a_6(i, j)$ in the image memory (6) is larger than the corresponding values $a_k(i, j)$ (k=4, 5, 7), it means that a block area of 3×3 pixels around this position contains a large edge component of a 45° diagonal direction from front right to back left. Thus a value "3" is written in the position (i, j) of the image memory (4) and the value $a_6(i, j)$ is written in the image memory (5). This procedure is conducted for all the pixel positions (i, j) whereby the image memory (4) stores the values 1-4 indicating the direction of the edge, and the image memory (5) stores the value corresponding to the direction of the largest edge component.

In more general terms, the above-explained procedure can be expressed, taking the image memory number having a largest value at (i, j) as N, by writing a value N-3 in the position (i, j) of the image memory (4) and writing said largest value in the position (i, j) of the image memory (5).

Step 205: This step set parameters required in the succeeding calculations. In the present embodiment, there is entered, via an, unrepresented keyboard through the parameter setting I/O port 26, a parameter indicating the size of the basic pixel block and a parameter indicating the shape of said pixel block. In the following embodiment, the former parameter is given in the form of $m_o$, $n_o$ representing the edges of a circumscribed rectangle, and the pixel block is given in four different shapes corresponding to the directionality detecting operators OP1-OP4 shown in FIG. 14.

When the pixel block is composed of 7×7 pixels, the pixel block corresponding to the operator OP1 assumes a form shown in FIG. 15, indicating the directionality from top right to bottom left. The mosaic processing is conducted on the pixels "1" but not on the pixels "0".

Also, a threshold value TH for meaningful directionality detection is entered via the keyboard, and is used for processing the aforementioned maximum value of directionality $a_k(i, j)$ stored in the image memory (5). Also, a shape of block for use in case said threshold value is not exceeded, is entered as shown in FIG. 15. Said block should preferably not show directionality, as exemplified in FIG. 16.

The above-mentioned parameters are set for each area of the reference image, divided in the step 203.

Then is entered the number NSTOP of the mosaic blocks to be generated later. It is also possible, however, to enter the area ratio P of the mosaic blocks and to determine said number from the following equation:

$$NSTOP = \left(\frac{Nx}{m_o}\right)\left(\frac{Ny}{m_o}\right) \times P$$

wherein Nx and Ny are the numbers of pixels in the X- and Y-direction of input image.

Step 206: There is discriminated whether the value of each pixel in the image memory (5), storing the maximum values of directionality, is larger than the threshold value TH entered in the step 205. If the value of the image memory (5) at a position (i, j) is smaller than the threshold value TH, a value "0" is written in a position (i, j) of the image memory (4). This means that meaningful directionality cannot be identified in this position, so that the conversion is unconditionally conducted with the pixel block form shown in FIG. 16, entered in the step 205.

In the present embodiment, the reference image is divided into two areas. Therefore, the threshold value TH1 is used for the main object area where the value of the flag map memory 19 is "0" at (i, j), and the threshold value TH2 is used for the background area where said value is "1". In this manner it is rendered possible to vary the mosaic processing between the main object area and the background area, in consideration of the directionality.

Step 207: FIG. 13 is a flow chart showing the details of the step 207.

Step 207-1: The random position memory for storing the randomly generated coordinates and the image memory (5) are reset to zero.

Step 207-2: The counter COUNT for counting the number of random coordinates is set to "1".

Step 207-3: Random numbers are generated to determine a coordinate.

Step 207-4: A value "1" is set in the random position memory corresponding to the generated random coordinate $i_R$, $j_R$.

Step 207-5: The content of said counter COUNT is increased by one.

Step 207-6: Steps 207-3 to 207-5 are repeated until the count of said counter COUNT reaches the necessary number NSTOP, and, when said number is reached, the sequence proceeds to the next step.

Step 208: The directional data $I_{direction}$ is set to "0", whereby the following process is conducted on a portion in which the threshold value TH is not reached in the foregoing step 206.

Step 209: The image memories (6), (7) and (8) are all reset to zero, for use in the succeeding synthesis of pixel values with shifting.

Step 210: There are selected coordinates where signals "1" are present in the random position memory / the image memory (5) (indicating the random coordinates) and where the values of the directional image data in the image memory (4) are same as the value of $I_{direction}$, which is currently "0". In this manner there are selected random coordinates (i, j) of which maximum value of the directionality is smaller than the threshold value TH, corresponding to the absence of directionality. Corresponding to the thus-selected coordinates (i, j), the input image data $a_k(i, j)$ (k=1, 2, 3) are respectively shifted to the shift memories $a_k(i, j)$ (k=6, 7, 8).

Step 211: The mosaic pixel pattern, of which the directional data correspond to the value of $I_{direction}$ which is currently zero, is read from the file prepared in the foregoing step 205. FIG. 16 shows an example of a mosaic pixel pattern of 7×7 pixels, in which pixels "1" are subjected to the mosaic processing while the original colors remain at the pixels "0".

Step 212: The shift memories are moved to each of the pixel positions in the mosaic image pattern to be processed, and the color information stored in the shift memories is given, at each pixel position, to the corresponding input image memory. This procedure will be explained in more detail in the following with reference to FIG. 17, taking the example of the mosaic image pattern of 7×7 pixels shown in FIG. 16. The color information held by the shift memory at first is that of the central position (pixel 0) of the mosaic image pattern. Then the shift memory is moved upwards by 3 pixels to the position of the pixel 1 in the mosaic image pattern, and, at this position, the color stored in the shift memory is transferred to the input image data memories/image memories (1), (2), (3). In this manner the color of the central pixel 0 is placed also at the pixel position 1. Then said shift memory is moved to left by a pixel and downwards by a pixel to the pixel position 2, and, at this position, the color stored in the shift memory is transferred to the input image data memory. In this manner the color of the central pixel 0 is also placed at the pixel position 2. By repeating this procedure to the pixel position 22, the color of the central pixel is given to all the pixels designated by the mosaic pixel pattern.

Step 213: The value of the directional data $I_{direction}$ is increased by 1, so that said value becomes equal to 1.

Step 214: The sequence returns to the step 204 to execute a process for a mosaic pattern shown in FIG. 15, in which the directional data is "1" corresponding to an edge direction from top right to bottom left.

The above-explained procedure is repeated until the directional data exceeds 4.

In the above-explained embodiment, four simple convolution operators as shown in FIG. 14 are employed as the edge detecting operators, but said operators may assume other forms, such as shown in FIG. 18. These operators can detect the edge directionality in the vicinity of a pixel position (i, j) by examining the correlation of the pixels values in a 3×3 matrix around said pixel position (i, j) and finding the maximum correlation.

In such case the mosaic patterns should preferably be entered in a number corresponding to the number of said operators.

Also in the foregoing embodiment, it is possible to adopt a smaller mosaic pattern in the first area (main object area) and a larger mosaic pattern in the second area (background area), thereby achieving finer reproduction in the main object area than in the background area.

Also the mosaic pattern employed in the main object area in case the detected maximum value of directionality does not reach the threshold value may be selected different from that in the background area. In this manner the main object area and the background area can be distinguished from the directionality of the mosaic patterns and the main object can be therefore emphasized.

Furthermore, the pixel block pattern to be employed in case the detected maximum value of directionality does not reach the threshold value may be randomly selected from the pixel block patterns corresponding to the operators OP1-OP4, instead of a particular pattern as shown in FIG. 16.

In such case, if the maximum detected value of directionality is less than the threshold value in step 206, the image memory (i, j) is given a number indicating the selected pixel block pattern instead of "0", and the value of $I_{direction}$ is set to "1" in step 208.

In the foregoing embodiment the image is divided into two areas, but it is also possible to divide the image into a larger number of areas and to apply respectively different processings to said areas.

The foregoing embodiment is capable of providing a mosaic-processed image different from the conventional rectangular mosaic blocks of a constant pitch, and utilizing the edge directionality of the original input image. The mosaic processing also be so conducted as to emphasize the main object, thus providing a more painting-like image.

Also, it provides a novel image that cannot be expected in the conventional "darkroom process" relying on silver-based photographic system or in the electronic platemaking system in the printing field, and expands the freedom of image preparation.

Also, the image processing can be executed without an expert, by presetting the representative parameters required for processing, so that it can be done at commercial processing laboratories. In the foregoing embodiment, an exclusive (dedicated) image processing apparatus is employed in the image processing unit, but the same effect can naturally be obtained by a general-purpose computer such as a mini-computer.

Also, in the foregoing embodiment the original image is entered from a film, but the same advantages can be obtained by receiving the image data directly from a still video camera or a video camera, or through a recording medium such as a floppy disk, a magnetic tape, an optical disk or a bubble memory.

As explained in the foregoing, the present invention is capable of providing a creative image in comparison with the conventional regular mosaic process, and is capable of a mosaic process utilizing the characteristics of the original image information.

What is claimed is:

1. An image processing apparatus comprising:
   converter means for converting information of a pixel of an original image into information of plural pixels; and
   processing means for randomly arranging the information of the plural pixels converted by said converter means.

2. An image processing apparatus according to claim 1, wherein said information of the pixel of the original image contains color factors of at least three colors.

3. An image processing apparatus according to claim 1, wherein the information of the plural pixels converted by said converter means is composed of a block of m×n pixels, wherein m and n are natural numbers.

4. An image processing apparatus according to claim 3, wherein said processing means is adapted to randomly arrange the information of said plural pixels in said block.

5. An image processing apparatus according to claim 1, further comprising detection mans for detecting the direction of an edge in the image from the original image for use in further processing.

6. An image processing apparatus according to claim 5, further comprising means for effecting a mosaic processing on the information randomly arranged by said processing means.

7. An image processing apparatus according to claim 6, wherein said mosaic processing means is adapted to effect a mosaic processing on the information randomly arranged by said processing means, according to the edge direction detected by said detection means.

8. An image processing apparatus according to claim 1, wherein said converter means is adapted to convert the information of the pixel of the original image into the information of the plural pixels in successive manner, by digitizing said information of the pixel to obtain information of a first one of the plural pixels, then adding any error between the digitized information and the information of the pixel of the original image to the information of the pixel of the original image, and digitizing the added information to obtain information for a second one of the plural pixels.

9. A image processing apparatus comprising:
converter means for converting information of a pixel of an original image into color information of plural colors;
detection means for detecting the proportions of the color information of the plural colors; and
control means for, in case the proportions of the color information detected by said detection means coincide with predetermined proportions, increasing the relative proportion of the color information of a particular color, among said plural colors, with respect to the color information of the other colors.

10. An image processing apparatus according to claim 9, wherein said converter means is adapted to convert the information of the pixel of the original image into color information of red (R), green (G) and blue (B).

11. An image processing apparatus according to claim 10, wherein said detection means is adapted to detect whether the color information of said three colors R, G and B has equal proportions.

12. An image processing apparatus according to claim 11, wherein, when said detection means detects that the color information of the three colors, R, G, B have equal proportions, said control means is adapted to increase the proportion of the color information of B among said three colors, with respect tot he color information of R and G.

13. An image processing apparatus according to claim 9, further comprising mosaic processing means for effecting a mosaic processing on the color information released from said control means.

14. An image processing apparatus according to claim 9, wherein said converter means is adapted to convert the information of the pixel of the original image into color information of plural pixels of plural colors.

15. An image processing apparatus comprising:
a dividing means for dividing an image into an object area and a background area;
processing means for effecting a mosaic processing on the image; and
control means for varying the mosaic processing of the background area from that of the object area.

16. An image processing apparatus according to claim 15, further comprising input means for designating the background are and the object area.

17. An image processing apparatus according to claim 15, further comprising detection means for detecting the directions of edges in the image, for use in further processing.

18. An image processing apparatus according to claim 17, wherein said processing means effects the mosaic processing by assigning a value representative of the original image to selected pixels in a block composed of plural pixels.

19. An image processing apparatus according to claim 18, wherein said control means is adapted to effect a predetermined mosaic processing regardless of said edge directions in the background area, and to effect a mosaic processing according to the edge directions in the object area.

20. An image processing apparatus according to claim 15, wherein said control means is adapted to vary the size of the mosaic processing of the background area from that of the object area.

21. An image processing apparatus according to claim 15, further comprising means for detecting the directions of edges in the image and values of directionality associated with the edges, wherein said control means is adapted to effect a mosaic processing according to the edge directions when the associated values of directionality are larger than a predetermined value, and to effect a predetermined mosaic processing regardless of the edge directions when the associated values of directionality are smaller than said predetermined value.

22. An image processing apparatus according to claim 21, wherein said predetermined value is different between the background area and the object area.

23. An image processing apparatus comprising:
dividing means for dividing an original image into blocks each composed of plural pixels;
detection means for detecting the directions of edges in the image from the original image; and
processing means for assigning values representative of the original image to selected pixels in each block divided by said dividing means according to the edge directions detected by said detection means.

24. An image processing apparatus according to claim 23, further comprising setting means for setting a background area and an object area in the original image, wherein said dividing means is adapted to vary the size of the blocks composed of plural pixels, between said background area and said object area.

25. An image processing apparatus according to claim 24, wherein said processing means is adapted to effect a process according to edge directions in the object area set by said setting means.

26. An image processing apparatus according to claim 23, wherein said detection means is adapted to detect values of directionality associated with the edges and said processing means is adapted to assign the representative values to the selected pixels in each block according to the edge directions when the associated values of directionality are larger than a predetermined value.

27. An image processing comprising:
digitizing means for digitizing information of a pixel of an original image; and
calculating means for effecting a calculation on the information digitized by said digitizing means,
wherein said calculating means comprises adding means for adding any error between the digitized information and the information of the pixel of the original image to the information of said pixel of the original image, and
wherein said calculating means is adapted to convert the information of the pixel of the original image into information of plural pixels by assigning the digitized information to a first one of the plural pixels, causing said digitizing means to digitize the information of the pixel of the original image to which the error has been added by said adding means and assigning the resulting digitized information to a next one of the plural pixels, then causing said adding means to add any error between the digitized information assigned to the next pixel and the information of the pixel of the original image to the information of the pixel of the original image, and repeating these steps until digitized information has been assigned to all of the plural pixels.

28. An image processing apparatus according to claim 27, wherein the information of the pixel of the original image is color information of three colors of red, green and blue.

29. A image processing apparatus according to claim 27, wherein the information of the plural pixels converted from the information of the pixel of the original image is composed of a block of m×n pixels wherein m and n are natural numbers.

30. An image processing apparatus according to claim 29, further comprising processing means for randomly assigning the digitized information to said plural pixels, wherein said processing means is adapted to randomly assign the digitized information to said plural pixels within said block.

31. An image processing apparatus according to claim 30, further comprising detection means for detecting the direction of an edge in the image from said original image for use in further processing.

32. An image processing apparatus according to claim 31, further comprising means for effecting a mosaic processing on the digitized information randomly assigned by said processing means.

33. An image processing apparatus according to claim 32, wherein said mosaic processing means is adapted to effect a mosaic processing on the information randomly assigned by said processing means, according to the edge direction detected by said detection means.

34. An image processing apparatus comprising:
    detection means for detecting a portion of low luminosity in an original color image;
    processing means for converting the hue of color date of the original color image to determine complementary color data for said color data; and
    control means for assigning the complementary color data for the color data obtained by said processing means to the portion of low luminosity detected by said detection means.

35. An image processing apparatus according to claim 34, further comprising first mosaic processing means for effecting a mosaic processing on said original color image.

36. An image processing apparatus according to claim 35, further comprising second mosaic processing means for effecting a mosaic processing on the complementary color data obtained by said processing means, and wherein mosaic processing is conducted by said second mosaic processing means after mosaic processing is conducted by said first mosaic processing means in the portion of low luminosity detected by said detection means.

37. An image processing apparatus according to claim 36, further comprising edge detection means for detecting directions of edges in the color image from said original color image, and wherein said first and second mosaic processing means are adapted to effect mosaic processing according to the edge directions detected by said edge detection means.

38. An image processing method comprising the steps of:
    converting information of a pixel of an original image into information of plural pixels; and
    processing the information of plural pixels to arrange randomly the information of plural pixels converted in said converting step.

39. An image processing method according to claim 38, wherein the information of the pixel of the original image is color information of red, green and blue.

40. An image processing method according to claim 38, wherein the information of the plural pixels converted in said converting step is composed of a block of m×n pixels where m and n are natural members.

41. An image processing method according to claim 40, wherein, in said processing step the information of the plural pixels in said block is arranged randomly.

42. An image processing method according to claim 38, further comprising the step of detecting the direction of an edge in the image from the original image for use in further processing.

43. An image processing method according to claim 42, further comprising the step of effecting mosaic processing on the information randomly arranged in said processing step.

44. An image processing method according to claim 43, wherein, in said mosaic processing step mosaic processing is effected on the information randomly arranged in said processing step, according to the edge direction detected in said detecting step.

45. An image processing method comprising the steps of:
    dividing an original image into blocks each composed of plural pixels;
    detecting the direction of an edge in the image from the original image; and
    arranging a representative value in a block produced in said dividing step in said block according tot he edge direction detected in said detecting step.

46. An image processing method according to claim 45, further comprising the step of setting a background area and an object area in the original image, wherein, in said dividing step the size of the block of plural pixels of the background are is varied from that of the object area.

47. An image processing method according to claim 46, wherein, in said arranging step a processing is effected according to the edge direction in the object area set in said setting step.

48. An image processing method according to claim 45, wherein, in said detecting step the direction and amount of the edge are detected, and, in said arranging step the representative value of a divided block is arranged according to the edge direction in said block when the amount of edge is larger than a predetermined value.

49. An image processing apparatus comprising:
    dividing means for dividing an original image into blocks each composed of plural pixels;
    detection means for detecting a directionality of image from the original image; and
    processing means for placing multi-level data of a representative pixel of each block divided by said dividing means in said block according to the directionality detected by said detecting means.

50. An image processing apparatus according to claim 49, further comprising setting means for setting a background area and an object area in the original image, wherein said dividing means is adapted to vary the size of said block composed of the multi-level data of the plural pixels, between the background area and the object area.

51. An image processing apparatus according to claim 50, wherein said processing means is adapted to effect processing according to an edge direction in the object area set by said setting means.

52. An image processing apparatus according to claim 49, wherein said detection means is adapted to detect amount and direction of edge, and said processing means is adapted to arrange the multi-level data of the representative pixel of each divided block in said block according to the edge direction when the amount of edge is larger than a predetermined value.

* * * * *

UNITED STATES PATENT AND TRADEMARK OFFICE
CERTIFICATE OF CORRECTION

PATENT NO.   : 5,164,825
DATED        : November 17, 1992
INVENTOR(S)  : TAKESHI KOBAYASHI, ET AL.

It is certified that error appears in the above-identified patent and that said Letters Patent is hereby corrected as shown below:

COLUMN 1

Line 32, "equipment," should read --equipment, or an--.

COLUMN 5

Line 45, "step" should read --step for--.

COLUMN 6

Line 35, "data" should read --data:--.

COLUMN 9

Line 17, "90" should read --90,--.
Line 22, "time" should read --times--.
Line 30, ", $\frac{20}{180})$" should read --, $\frac{20}{180})$,--.
Line 42, "output," should read --output--.

COLUMN 12

Line 3, "m40 ,n':" should read --m', n':--.
Line 48, ($x_4$," should read --($x_R$,--.
Line 59, "brush" should read --brush.--.

COLUMN 13

Line 53, "$x_4$," should read --$x_R$,--.
Line 58, "($x_4$," should read --($x_R$,--.

UNITED STATES PATENT AND TRADEMARK OFFICE
CERTIFICATE OF CORRECTION

PATENT NO. : 5,164,825
DATED : November 17, 1992
INVENTOR(S) : TAKESHI KOBAYASHI, ET AL.

It is certified that error appears in the above-identified patent and that said Letters Patent is hereby corrected as shown below:

COLUMN 14

Line 1, "$(x_4,$" should read --$(x_R,$--.
Line 19, "ground" should read --ground,-- and "background," should read --background--.
Line 30, "$(x_4,$" should read --$(x_R,$--.
Line 39, "$(x_4,$" should read --$(x_R,$--.

COLUMN 15

Line 19, "of the color" should be deleted.
Line 20, "$(x_4,$" should read --$(x_R,$--.

COLUMN 16

Line 56, "achieved" should read --achieve--.

COLUMN 17

Line 30, "column" should read --column)--.
Line 31, "processing.  Step 107:" should read --processing.  ¶ Step 107:--.

COLUMN 18

Line 38, "direction" should read --directional--.

COLUMN 19

Line 64, "embodiment" should read --embodiment,--.

UNITED STATES PATENT AND TRADEMARK OFFICE
CERTIFICATE OF CORRECTION

PATENT NO. : 5,164,825
DATED : November 17, 1992
INVENTOR(S) : TAKESHI KOBAYASHI, ET AL.

It is certified that error appears in the above-identified patent and that said Letters Patent is hereby corrected as shown below:

COLUMN 20

Line 4, "$X_4(x0,$" should read --$X_R(x0,$--.

COLUMN 21

Line 16, "2." should read --22.--.

COLUMN 22

Line 18, "sensitivity" should read --sensitivity,--.

COLUMN 27

Line 29, "tot he" should read --to the--.
Line 30, "G" sould read --G.--.
Line 49, "are" should read -area--.

COLUMN 28

Line 37, "edges" should read --edges,--.

COLUMN 30

Line 4, "step" should read --step,--.
Line 24, "tot he" should read --to the--.
Line 30, "are" should read --area--.
Line 33, "step" should read --step,--.

UNITED STATES PATENT AND TRADEMARK OFFICE
CERTIFICATE OF CORRECTION

PATENT NO. : 5,164,825

DATED : November 17, 1992

INVENTOR(S) : TAKESHI KOBAYASHI, ET AL.

It is certified that error appears in the above-identified patent and that said Letters Patent is hereby corrected as shown below:

<u>COLUMN 30</u>

Line 37, "step" should read --step,--.
   Line 39, "step" should read --step,--.

Signed and Sealed this

Eighth Day of February, 1994

Attest:

BRUCE LEHMAN

Attesting Officer     Commissioner of Patents and Trademarks